United States Patent
Ho et al.

(10) Patent No.: US 10,127,945 B2
(45) Date of Patent: Nov. 13, 2018

(54) VISUALIZATION OF IMAGE THEMES BASED ON IMAGE CONTENT

(71) Applicant: Google Inc., Mountain View, CA (US)

(72) Inventors: Bo-Jhang Ho, Los Angeles, CA (US); Sevket Derin Babacan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/071,154

(22) Filed: Mar. 15, 2016

(65) Prior Publication Data

US 2017/0270970 A1    Sep. 21, 2017

(51) Int. Cl.
| | |
|---|---|
| H04N 5/93 | (2006.01) |
| G11B 27/036 | (2006.01) |
| G06K 9/00 | (2006.01) |
| G06F 17/30 | (2006.01) |

(52) U.S. Cl.
CPC ...... *G11B 27/036* (2013.01); *G06F 17/30247* (2013.01); *G06F 17/30259* (2013.01); *G06K 9/00288* (2013.01); *G06K 9/00302* (2013.01)

(58) Field of Classification Search
CPC ........................ G06K 9/00288; G06K 9/00302
USPC ........................................................ 386/280
See application file for complete search history.

(56) References Cited

U.S. PATENT DOCUMENTS

| | | | |
|---|---|---|---|
| 8,254,647 B1 | 8/2012 | Nechyba et al. | |
| 9,519,957 B1* | 12/2016 | Kulewski | G06T 5/008 |
| 2006/0259863 A1 | 11/2006 | Obrador et al. | |
| 2007/0177805 A1 | 8/2007 | Gallagher | |
| 2008/0080774 A1 | 4/2008 | Jacobs et al. | |
| 2008/0112621 A1 | 5/2008 | Gallagher et al. | |
| 2008/0215984 A1 | 9/2008 | Manico et al. | |
| 2008/0306995 A1 | 12/2008 | Newell et al. | |
| 2009/0252383 A1 | 10/2009 | Hartwig et al. | |
| 2011/0154197 A1 | 6/2011 | Hawthorne et al. | |
| 2012/0159337 A1 | 6/2012 | Travilla et al. | |

(Continued)

FOREIGN PATENT DOCUMENTS

| | | |
|---|---|---|
| EP | 1921627 | 6/2009 |
| KR | 20150086770 | 7/2015 |
| WO | 2013/096320 | 6/2013 |

OTHER PUBLICATIONS

Microsoft.com Store, Microsoft Photo Story app download screen, https://www.microsoft.com/en-us/store/apps/photo-story/9nblggh1z351, 2015, 11 pages.

(Continued)

*Primary Examiner* — Helen Shibru
(74) *Attorney, Agent, or Firm* — IP Spring

(57) ABSTRACT

Implementations relate to visualizations including images based on image content. In some implementations, a computer-implemented method includes obtaining a set of images, determining one or more pixel characteristics of the set of images, and determining one or more faces depicted in the plurality of images based on one or more pixel characteristics. The method selects a group of images of the set of images, where each image in the group of images depicts a different group of faces than depicted in the other images in the set of images. The method generates a visualization including the group of images, and provides the visualization to a user device in response to a user request to cause the group of images to be displayed by the user device.

15 Claims, 11 Drawing Sheets

(56) References Cited

U.S. PATENT DOCUMENTS

| | | | |
|---|---|---|---|
| 2014/0161326 A1 | 6/2014 | Ganong et al. | |
| 2014/0254945 A1 | 9/2014 | Hibino et al. | |
| 2014/0317480 A1 | 10/2014 | Chau et al. | |
| 2014/0320697 A1 | 10/2014 | Lammers et al. | |
| 2014/0340409 A1 | 11/2014 | Murphy-Chutorian et al. | |
| 2014/0341442 A1* | 11/2014 | Lewis | G06K 9/00248 382/118 |
| 2015/0117794 A1 | 4/2015 | Murphy-Chutorian et al. | |
| 2015/0318020 A1* | 11/2015 | Pribula | H04N 21/43615 386/227 |
| 2016/0042249 A1 | 2/2016 | Babenko et al. | |

OTHER PUBLICATIONS

Martonik, Andrew, "Where did Auto Awesome go in Google Photos?", Android Central, http://www.androidcentral.com/where-did-auto-awesome-go-google-photos, Jun. 5, 2015, 24 pages.

Summers, Nick, "Auto Awesome Movies for Google+ secretly edits your best videos into a slick, customizable highlight reel", TNW News, http://thenextweb.com/google/2013/10/29/google-photo-editing-tool-auto-awesome-now-creates-stunning-edits-videos/, Oct. 29, 2013, 3 pages.

Thomas, Jr., George, "New app creates stylized story compilations from your photos", Microsoft.com; http://blogs.microsoft.com/next/2015/08/13/new-app-creates-stylized-story-compilations-from-your-photos/, Aug. 13, 2015, 4 pages.

EPO, International Search Report for International Patent Application No. PCT/US2017/049979, dated Nov. 15, 2017, 5 pages.

EPO, Written Opinion for International Patent Application No. PCT/US2017/049979, dated Nov. 15, 2017, 7 pages.

EPO, Written Opinion of the International Preliminary Examining Authority for International Patent Application No. PCT/US2016/068429, dated Feb. 12, 2018, 9 pages.

EPO, International Preliminary Report on Patentability for International Patent Application No. PCT/US2016/068429, dated May 11, 2018, 19 pages.

European Patent Office, International Search Report for International Patent Application No. PCT/US2016/068429, dated Mar. 9, 2017, 6 pages.

European Patent Office, Written Opinion for International Patent Application No. PCT/US2016/068429, dated Mar. 9, 2017, 9 pages.

\* cited by examiner

VISUALIZATION OF IMAGE THEMES BASED ON IMAGE CONTENT

BACKGROUND

The popularity and convenience of digital cameras as well as the widespread of use of Internet communications have caused user-produced visual content such as digital photographs and videos to become ubiquitous. For example, users of Internet platforms and services such as email, forums, user content repositories, and network services post photos and videos for themselves and others to view. Photos and videos can be posted by users to a network service for private viewing (e.g., friends or other small groups of users) and/or public viewing by many users. Photos and videos can be edited by users in various ways, e.g., using editing programs to manually edit photos and videos.

SUMMARY

Implementations generally relate to visualizations including images based on image content. In some implementations, a computer-implemented method to provide a visualization from images includes obtaining a set of images, determining one or more pixel characteristics of the set of images, and determining one or more faces depicted in the plurality of images based on one or more pixel characteristics. The method selects a group of images of the set of images, where each image in the group of images depicts a different group of faces than depicted in the other images in the group of images. The method generates the visualization including the group of images, and provides the visualization to a user device in response to a user request to cause the group of images to be displayed by the user device.

Various implementations and examples of the method are described. For example, the visualization can be a video, and each image in the group of images can be displayed in the video in a particular sequence. Creating the visualization can include placing images depicting a greater number of persons at a beginning or an end of the sequence of the video, and placing images depicting a fewer number of persons are placed at a middle of the sequence between the beginning and the end of the sequence. Each image can be displayed for an amount of time in the sequence based on a number of faces in the associated image. The plurality of images can be provided as frames in one or more videos, and selecting a group of images can include selecting a group of video clips from the one or more videos, each of the video clips including multiple frames.

Selecting a group of images can include selecting only images depicting faces of a group of a plurality of persons, where each image in the group of images can depict at least one face that is different than the faces depicted in the other images in the group of images. The method can further include detecting visual capture characteristics of the plurality of images, including brightness, sharpness, tint, and/or color. The method can further include detecting one or more emotions depicted in the plurality of images, including determining an emotional strength score for at least one face depicted in one or more if the plurality of images, where selecting a group of images can include selecting images depicting faces portraying an emotion having an associated emotional strength score that satisfies a predetermined threshold. Selecting a group of images can include determining a person who most frequently appears in the plurality of images, and selecting at least one of the plurality of images that depicts the person to include in the group of images.

The method can further include determining a score for each of a plurality of templates based on a frequency or strength of one or more characteristics for the associated template as detected in the plurality of images, where each template can define a different set of characteristics of images as a basis to select the group of images from the set of images. A recommended group of templates can be determined from the templates based on the scores of the templates, the recommended group of templates can be provided for display on a user device as displayed elements selectable by a user, and a selection of at least one template of the recommended group of templates can be received based on input received from the user, where selecting the group of images is based on the at least one selected template.

In some implementations, a non-transitory computer readable medium has stored thereon software instructions that provide a visualization from images. The software instructions, when executed by a processor, cause the processor to perform operations including obtaining a set of images and determining one or more pixel characteristics of the set of images. The operations include detecting one or more faces and one or more emotions depicted in the plurality of images based on the one or more pixel characteristics. The operations include selecting a group of images of the plurality of images, where each image in the group of images depicts one or more faces portraying one or more emotions having an emotional strength score satisfying a threshold. The operations include generating the visualization including the group of images, and providing the visualization to a user device in response to a user request to cause the group of images to be displayed by the user device.

Various implementations and examples of the computer readable medium are described. For example, the group of images can include one or more sequences of images portraying a change in emotional strength scores for one or more faces depicted in the group of images, where the change in emotional strength scores is above a change threshold within a range of successive frames. In some examples, the group of images may only include images depicting faces of a single person. The processor can further perform an operation including receiving user input from a user, the user input specifying one or more particular types of emotions to be depicted in the selected group of images. In some examples, the visualization can be a video, where each image in the group of images is displayed in the video in a particular sequence, and each image is displayed for an amount of time in the sequence based on the emotional strength score of the associated image.

In some implementations, a system to provide a visualization from images includes a storage device and at least one processor operative to access the storage device. The processor is configured to obtain a set of images and determine one or more pixel characteristics of the set of images. The processor is configured to detect one or more image features depicted in the set of images based on the examined one or more pixel characteristics. The processor is configured to select a template based on the one or more image features of the set of images, where the selected template defines a set of image characteristics. The processor is configured to select a group of images of the set of images, where each image in the group of images includes one or more image characteristics defined by the selected template. The processor is configured to generate a visualization including the group of images, and provide the visualization to a user device in response to a user request to cause the group of images to be displayed by the user device.

Various implementations and examples of the system are described. For example, the processor can select the template from a plurality of templates, where each template defines a different set of image characteristics. The processor can be configured to select a template, including determining a score for each template based on a frequency or strength of the one or more characteristics for the associated template as detected in the set of images, and selecting one or more of the templates having best scores. The plurality of templates can include at least one of: a group template instructing to select images based on a number of faces depicted in the set of images; an emotion template instructing to select images based on a strength of emotions depicted in faces appearing in the set of images; and an emotion change template instructing to select images based on a magnitude of change of emotions depicted in faces in the set of images. The processor can be further configured to determine a score for each template based on a frequency or strength of the one or more characteristics for the associated template as detected in the set of images, determine a recommended group of templates from the plurality of templates based on the scores of the templates, and provide the recommended group of templates for display on a user device as displayed elements selectable by a user.

DETAILED DESCRIPTION

Figure 1:
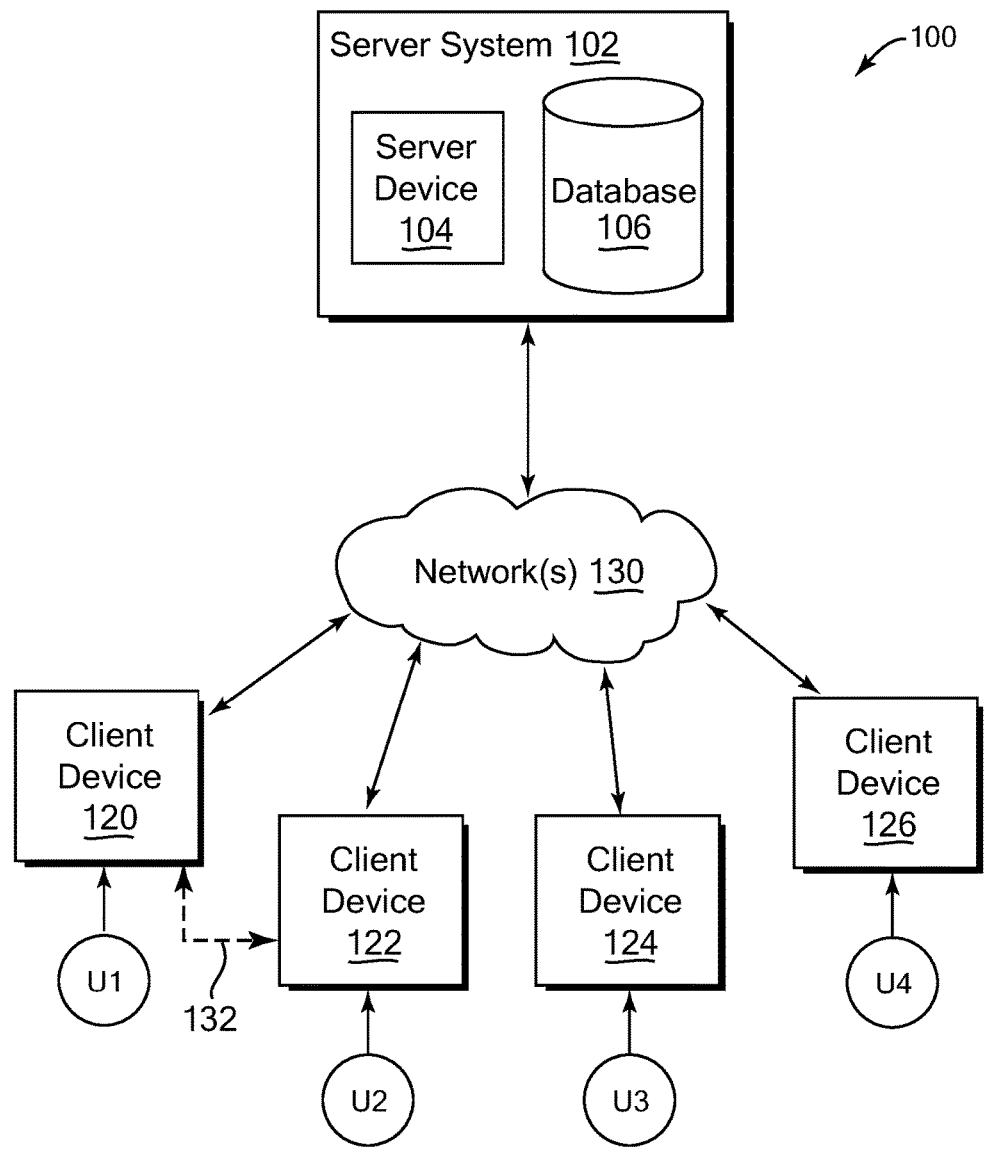
FIG. 1 is a block diagram of an example network environment which may be used for one or more implementations described herein.

One or more implementations described herein relate to visualizations including images based on the content of the images. The images in the visualizations can include photos, videos, and/or other forms of images. Some example systems can determine image features in a set of images and select a group of images from the image set, where each image in the group of images presents one or more similar image characteristics. For example, the similar image characteristics can be a number or frequency of image features such as faces, or can be feature characteristics such as strength or change of emotions shown in depicted faces. A visualization (e.g., summary or movie) that includes the group of selected images is generated, and this visualization can be provided to a user device in response to a user request to cause the group of images to be displayed by the user device.

In some examples, selected images in the visualization can include a characteristic of multiple faces, where the visualization presents different groups of people from a set images. In another example, the images in the visualization can be selected based on emotions expressed by depicted faces, e.g., strong emotions of happiness, sadness, etc. Another example can provide images in the visualization showing a large change in emotion in a particular face or faces depicted in the images. User input can be received to modify (e.g., further specify or change) template criteria in selection of images.

In some implementations, a template can be used to provide the criteria and instructions for selecting the images for the visualization. For example, a group template can be used to provide selected images based on a theme of groups of persons depicted in images, and can specify criteria such as the minimum number of faces in each selected image, the amount of difference between groups and people depicted in the selected images, etc. An emotion template can specify the minimum strength of emotion that should be present in selected images, based on estimated emotional strength scores for depicted faces. An emotion change template can specify the minimum amount of change in emotion strength that should be present in a selected sequence of images. Various other criteria and templates can also or alternatively be used. Some implementations can evaluate (e.g., determine a score for) multiple available templates based on one or more image features detected in the set of images, can recommend one or more templates to a user based on the evaluation, and can receive user selection of templates to be used for a set of images.

In some implementations, the visualization can be a video or other sequential display of images (including video clips), for example, where each image selected for the visualization is displayed in the visualization in a particular sequence. Described techniques can generate the visualization based on instructions specified in applied templates, user preferences, system settings, etc. For example, in a visualization based on a group template, images depicting a greater number of persons can be placed in the visualization sequence at a beginning and an end of the sequence, and images depicting a fewer number of persons can be placed at a middle of the sequence. The timing of the display of images in the visualization can be varied based on the image content or other image characteristics. For example, images can be displayed for an amount of time based on a number of faces in the associated image, based on the strength of the emotions shown by faces depicted in the images, etc.

Various described features can allow a system to present a visualization of images to a user that have common characteristics, e.g., presenting a theme, motif, or idea. For example, described techniques can examine a user's collection of images to find image features that are amenable to particular themes as specified in templates or other instructions. A visualization can be generated automatically, without user input or intervention, for a user, and displayed on a user device, e.g., as a movie or other image presentation. A visualization can summarize or present images from a large set of images based on the particular themes or image characteristics. Described visualizations can present images having diversity and variety, in an order suitable for the content of the images, and/or in ways to create more user interest in the content of the presented images.

A system using one or more features described herein can provide quality visualizations presenting and summarizing image content according to image characteristics and themes. The system can automatically examine collections of images, remove lower quality images, select images appropriate to various and/or relevant characteristics or themes, and generate and display a visualization including the selected images. In another example, described features, including precise conditions under which images are selected from a collection, can provide a particular consistent and/or narrow theme or characteristic to be provided in a visualization of images. In another example, features including selection of a template that specifies conditions under which images are to be selected, where the template is selected based on image features and characteristics in a collection of images, can allow appropriate themes and characteristics for a visualization to be determined by a system without user specification of such themes and characteristics. These various features can reduce time and effort of manual visualization creation and editing tasks. Thus, described techniques allow avoidance of extensive and tedious manual reviewing images and videos by a user to create such visualizations. Consequently, a technical effect of one or more described implementations is that image visualization creation tasks may be reduced in time and resources expended to obtain relevant results to a user. For example, a technical effect of described features is a reduction in the problem of consumption of system processing resources required for storage, display, and editing of images and videos that may otherwise be used by a system to allow manual visualization creation tasks. In another example, a technical effect of described features is a more comprehensive visualization including more images (e.g., photos, video clips) that are relevant to a characteristic or theme than would be feasible from manual selection from a large collection of such images.

In situations in which the systems and methods discussed herein may collect or use personal information about users (e.g., user data, information about a user's social network, user's location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated b so that no personally identifiable information can be determined. As another example, a user's geographic location may be generalized to a larger region so that the user's particular location cannot be determined.

An "image" as referred to herein can be a still image, single image, or standalone image, or can be an image included in a series of images, e.g., a frame in a video sequence of video frames, or an image in a different type of sequence or collection of images. For example, implementations described herein can be used with single images (photos) or with one or more images in a sequence or in a video. Herein, "satisfying" a threshold indicates at least meeting the threshold. For example, if a threshold provides a minimum value, than any value over the threshold satisfies the threshold.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., desktop computer, laptop computer, portable or mobile device, cell phone, smart phone, tablet computer, television, TV set top box or entertainment device, wearable devices (e.g., display glasses or goggles, wristwatch, headset, armband, jewelry, etc.), personal digital assistant (PDA), media player, game device, etc. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service, implemented on server system 102. For example, respective client devices 120, 122, 124, and 126 may communicate data to and from one or more server systems (e.g., system 102). In some implementations, the server system 102 may provide appropriate data to the client devices such that each client device can receive communicated content or shared content uploaded to the server system 102 and/or network service. In some implementations, a "user" can include one or more programs or virtual entities, as well as persons that interface with the system or network.

A user interface can enable display of visualizations, images, video, data, and other content as well as communications, privacy settings, notifications, and other data on a client device 120, 122, 124, and 126 (and/or on server system 102). Such an interface can be displayed using software on the client device, software on the server device, and/or a combination of client software and server software executing on server device 104, e.g., application software or client software in communication with server system 102. The user interface can be displayed by a display device of a client device or server device, e.g., a display screen, projector, etc. In some implementations, application programs running on a server system can communicate with a client device to receive user input at the client device and to output data such as visual data, audio data, etc. at the client device.

In some implementations, server system 102 and/or one or more client devices 120-126 can provide an image editing program and/or an image display program. The image editing/display program may allow a system (e.g., client device or server system) to provide options for editing and displaying an image and/or a video. The image program can provide an associated user interface that is displayed on a display device associated with the server system or client device. The user interface may provide various options to a user to select images and editing options, editing modes, display modes, etc. for one or more images.

Other implementations of features described herein can use any type of system and/or service. For example, photo and video collection services or other networked services (e.g., connected to the Internet) can be used instead of or in addition to a social networking service. Any type of electronic device can make use of features described herein. Some implementations can provide features described herein on client or server devices disconnected from or intermittently connected to computer networks. In some examples, a client device including or connected to a display device can examine and display images stored on storage devices local to the client device (e.g., not connected via a communication network) and can provide features and results as described herein that are viewable to a user.

Figure 2:
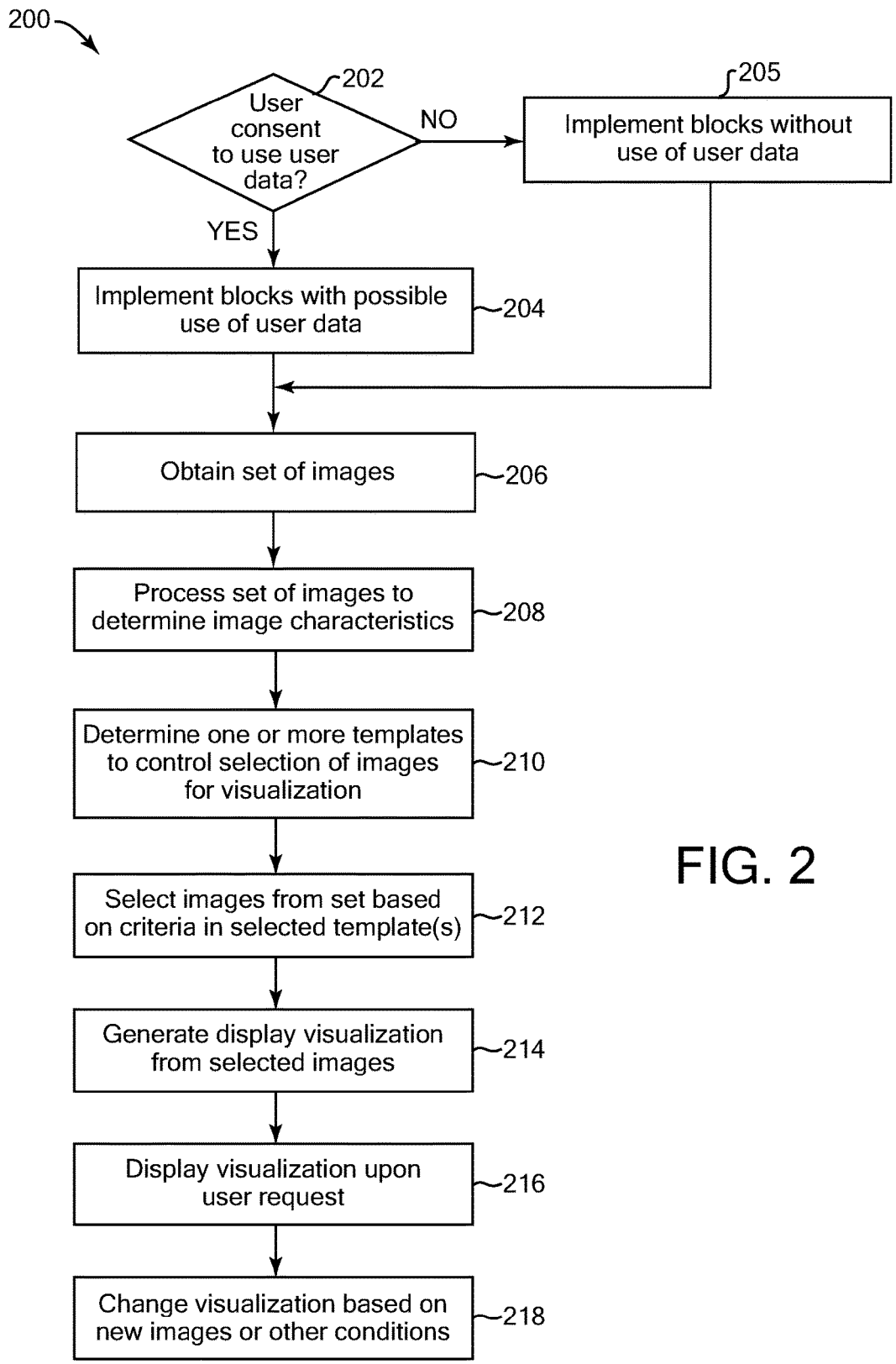
FIG. 2 is a flow diagram illustrating an example method to provide visualizations of images based on content of images, according to some implementations.

FIG. 2 is a flow diagram illustrating one example of a method 200 to provide visualizations of images based on content of images. In various implementations, some or all of the method 200 can be implemented on one or more client devices 120, 122, 124, or 126 as shown in FIG. 1, on one or more server devices (e.g., server system 102 as shown in FIG. 1), and/or on both server device(s) and client device(s). In described examples, the implementing system includes one or more digital processors or processing circuitry ("processors"), and one or more storage devices (e.g., a database 106 or other storage). In some implementations, different components of one or more servers and/or clients can perform different blocks or other parts of the method 200.

Some implementations can initiate method 200 based on user input. A user may, for example, have selected the initiation of the method 200 from a displayed user interface. In some implementations, method 200 or portions thereof can be performed with guidance by the user via user input in a user interface or other input device or interface.

In some implementations, the method 200, or portions of the method, can be initiated automatically by a system. For example, the method (or portions thereof) can be periodically performed, or performed based on one or more particular events or conditions, e.g., an application being opened by a user, receiving one or more images that have been newly uploaded to or accessible by the system, a predetermined time period having expired since the last performance of method 200, and/or one or more other conditions occurring which can be specified in settings of a system. In some implementations, such conditions can be previously specified by a user in stored custom preferences of the user (accessible with user consent). In one example, a server system can receive one or more input images (including videos) uploaded from one or more users, and can perform the method 200 for the newly-uploaded images. In another example, a system (server or client) can perform the method 200 for a large collection of accessible images, e.g., a user's collection of images (if user consent is received). In another example, a camera, cell phone, tablet computer, wearable device, or other client device can capture one or more images and can perform the method 200. In addition or alternatively, a client device can send one or more captured images to a server over a network, and the server can process the images using method 200.

In block 202, it is checked whether user consent (e.g., user permission) has been obtained to use user data in the implementation of method 200. For example, user data can include user preferences, information about a user's social network and contacts, user characteristics (identity, name, age, gender, profession, etc.), social and other types of actions and activities, content created or submitted by a user, ratings made by a user, opinions created or submitted by a user, a user's current location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 206. If user consent has not been obtained, it is determined in block 205 that blocks are to be implemented without use of user data, and the method continues to block 206. In some implementations, if user consent has not been obtained, the remainder of method 200 is not performed.

In block 206 of method 200, a set of images is obtained for processing. The images can be digital images composed of multiple pixels, for example, and can be stored on one or more storage devices of the system or otherwise accessible to the system, e.g., a connected storage device such as a local storage device, storage device connected to or in communication with a network accessible to the system, etc. For example, the images can include photos captured by a camera, one or more videos each including a sequence of multiple images, one or more image frames extracted from a video stream or other video data, or images derived from other sources.

In some implementations, a user can provide, select, or designate one or more of the images in the set to obtain for processing. In some implementations, the set of images can be automatically obtained by the method, e.g., as images from a stored collection of multiple images, e.g., from a user's album(s), a pool of stored images submitted by users, etc. Automatic obtaining of images from a user's collection is performed with the user's consent as indicated in block 204, e.g., via stored user preferences accessed by block 206. The collections can be locally stored and accessible by the system performing method 200, and/or can be remotely stored on a server or client device, e.g., as one or more albums provided in account(s) of user(s) of a network service. In some implementations, the system can determine which images to select based on evaluating one or more characteristics of accessible images, e.g., timestamps and other metadata of images, the color distributions of images, the recognized content or labels describing content in images, user data such as user preferences, etc. (accessed with user consent).

For example, in some implementations, a system can automatically (e.g., without human intervention) select images for processing. For example, such selection may be determined (with user consent) based on user data, including stored user preferences, a user history of previous modifications made by the user to other images, social data indicating user preferences (e.g., previous comments, ratings, etc. made by the user), recent or upcoming events based on the user's stored calendar or planner, locations visited or to be visited by the user (e.g. as detected by GPS sensors on a device carried by the user), activities of the user (e.g., sensed or inferred by locations visited by the user), etc.

In block 208, the set of images is processed to determine image characteristics of the images. The determined image characteristics can include a variety of different characteristics, including visual pixel characteristics and other image characteristics. The visual pixel characteristics can include visual capture characteristics (e.g., image brightness, sharpness, etc.), image content characteristics (e.g., characteristics of depicted features including faces and facial features, objects, etc.), and other visual image characteristics. Some image characteristics can include semantic content including image features, topics, categories, etc. Some examples of processing and extraction of image characteristics are described below with respect to FIG. 3. In some implementations, the method 200 can use determined image characteristics present in the set of images to assist determination of templates to use as described below.

Some implementations can examine individual frames in video data as one or more of the images. To reduce processing, some implementations can sample a subset of the frames of a video to determine image characteristics in only the sampled frames. For example, every Nth frame of a video can be selected for processing, where N is a specified integer. In some implementations, a different technique can be used to, e.g., determine particular key frames or representative frames for processing, e.g., frames that depict relevant content, are representational of the video subject matter, and/or are not too similar to other sampled frames (e.g., under a threshold similarity measure). For example, detecting large differences in color content (e.g., histogram data) between consecutive frames, detecting frames in between transitions in shot sequences, and/or other methods can be used by a system to find particular frames in a video to process.

In some implementations, image characteristic determination of block 208 can be performed as pre-processing, before performing other blocks of method 200 (e.g., blocks 210-218). In some cases or implementations, block 208 can be partially or completely performed simultaneously or after other blocks in method 200. In some examples, a template may provide criteria to select images as described below, and the processing of block 208 can be at least partially performed during image selection for the template. In one example, a template may specify to find and select images with happy faces (e.g., an emotion template as described below), and additional images that were captured close in time to a detected happy face image can then be processed in block 208 to detect image characteristics such as emotions.

In block 210, in some implementations, one or more templates can be determined to control the selection of images for the visualization. A template, as referred to herein, is a set of criteria, instructions, requirements, and/or guidelines for image selection. Some templates can be constructed in terms of a theme, motif, or unifying idea. The template can define a particular set of image characteristics which should be at least partially present in the images selected based on that template, examples of which are described below. In some implementations, multiple templates may be available for selection, e.g., stored in local or remote storage, and one or more templates can be selected (designated) for use in generating a particular visualization in method 200. Various implementations can automatically determine one or more templates to use, can receive input from a user that indicates one or more templates to use, etc. Some example implementations of template determination are described below with respect to FIG. 4.

In block 212, a group of images is selected from the set of images based on criteria specified in the selected template(s). For example, the criteria can be specified in stored instructions associated with the template(s). In some implementations, the instructions of a selected template can instruct selection of images that qualify based on specific image characteristics and/or conditions related to the image characteristics. In some implementations, only the images of the set that qualify based on the criteria are selected. The set of images can be examined for the specified characteristics and images that qualify under the specified criteria are selected. If one or more videos are included in the set of images, then relevant videos, or portions (e.g., clips) of the videos, that qualify under the criteria can be selected and extracted if appropriate. If multiple templates have been selected for use, then in some implementations, images can be selected that qualify under the criteria of any one or more of the templates, where some images may qualify under criteria of multiple templates. Other implementations can require that selected images qualify under all the criteria of the applied templates.

In block 214, data forming a visualization (e.g., summary visualization) is generated from the selected images. The visualization is a collection of the selected images that can be displayed for a user, which can take any of a variety of forms. For example, the visualization can take the form of a movie that displays the selected images in a particular sequence. In some implementations, the visualization can take the form of a collage or other visual collection of multiple selected images displayed at one time. In some examples, a collage can include images displayed within other images, e.g., one image displayed at a smaller size positioned within a different image displayed at a larger size. Other visualizations can modify (e.g., distort) one or more of the selected images in a visual display, e.g., to fill an existing outline or area.

In one example, the selected images are provided in a sequence that forms a video (e.g., movie). Selected images that are still images (e.g., photographs or image frames extracted from video) can be placed in the movie summary so that they are each displayed for a length of time, where the length of time can be constant or vary based on a variety of factors as described below for FIG. 7. Selected images that are portions of video can be placed in the movie summary directly without modification, or can be modified in one or more characteristics, e.g., to fit criteria specified by the selected template, preferences, and/or settings (e.g., reduced or lengthened in playtime, one or more video frames removed or duplicated/padded, etc.). The selected templates can indicate how to sequence or otherwise place the images in the summary, e.g., a particular order, emphasizing or weighting some images before others, etc. Some examples of generating a movie summary are described below with reference to FIG. 7.

In block 216, the generated visualization is displayed, or provided for display, e.g., upon request of a user or automatically without user input in some implementations. In one example, the visualization can be a movie and the user device displays the movie in a sequence of the selected images. For example, the visualization can be displayed on one or more display screens of a device, projected on a surface by a projector device, etc. In some examples, a user can input a command to a displayed user interface of a user device that can access the generated visualization, and the visualization is displayed by a display device (e.g., display screen) of the user device. For example, user input commands can include contact by the user of a touchscreen, selecting or moving an input device (e.g., mouse, joystick, touchpad, etc.). Other types of user input commands can alternatively be received, e.g., voice commands determined by voice recognition techniques, or motion or spatial commands based on motion or position of a user, portions of a user, or a user device in physical space (e.g., shaking or tilting a device), etc.

In some implementations, the user request can be implicit, e.g., where the visualization is displayed in response to one or more conditions occurring as specified by user preferences or settings stored by the user device or a user account (e.g., stored on a server system) that is accessed by the user device. The data of the visualization can also be caused to be otherwise output by a system, e.g., transmitted to another system via a communications network, etc.

In block 218, the visualization can be changed based on one or more newly obtained images or other conditions. For example, if the visualization is based on a set of images owned or accessible by a user, as a user captures or otherwise receives new images on devices accessible to the user, one or more of these images can be incorporated into the visualization if they qualify. For example, blocks 208-216 can be performed again with a set of images that includes the new images. Furthermore, new templates can be available or specified by a user, or criteria of existing templates can be changed by a user, which can change the visualization. In some cases, other conditions may cause changes to the visualization. For example, after viewing the visualization in block 216, a user may wish to select another template to add more images to the visualization, or remove a previously-applied template to remove some images from the visualization. The method 200 can be re-performed based on such changes.

In some implementations, a visualization can be edited directly. For example, a user can use an image or video editing program to change individual images or frames of the visualization, add or delete images to the visualization, and/or change the order of or otherwise combine various portions (e.g., video or image sequences) of a particular visualization or portions of different visualizations. In some examples, a user interface can presented to the user and include a timeline and images/video clips to be played at specific times. Using displayed interface controls, the user can adjust the order or time of playback of an image or video clip, the play time/length of an image/video clip, insert and/or delete images/video clips. Various interface controls can allow a user to provide input to zoom, tilt, and/or crop images of the visualization. Special effects can be added, e.g., transition effects between adjacent images or frames in the visualization sequence, and/or visual effects applied on images/clips (e.g., masking an image, color adjustment, magnifying glass effect, etc.). Some implementations can provide one or more of these editing tasks automatically to the visualization by an editing program, e.g., based on stored preferences of the user.

Figure 3:
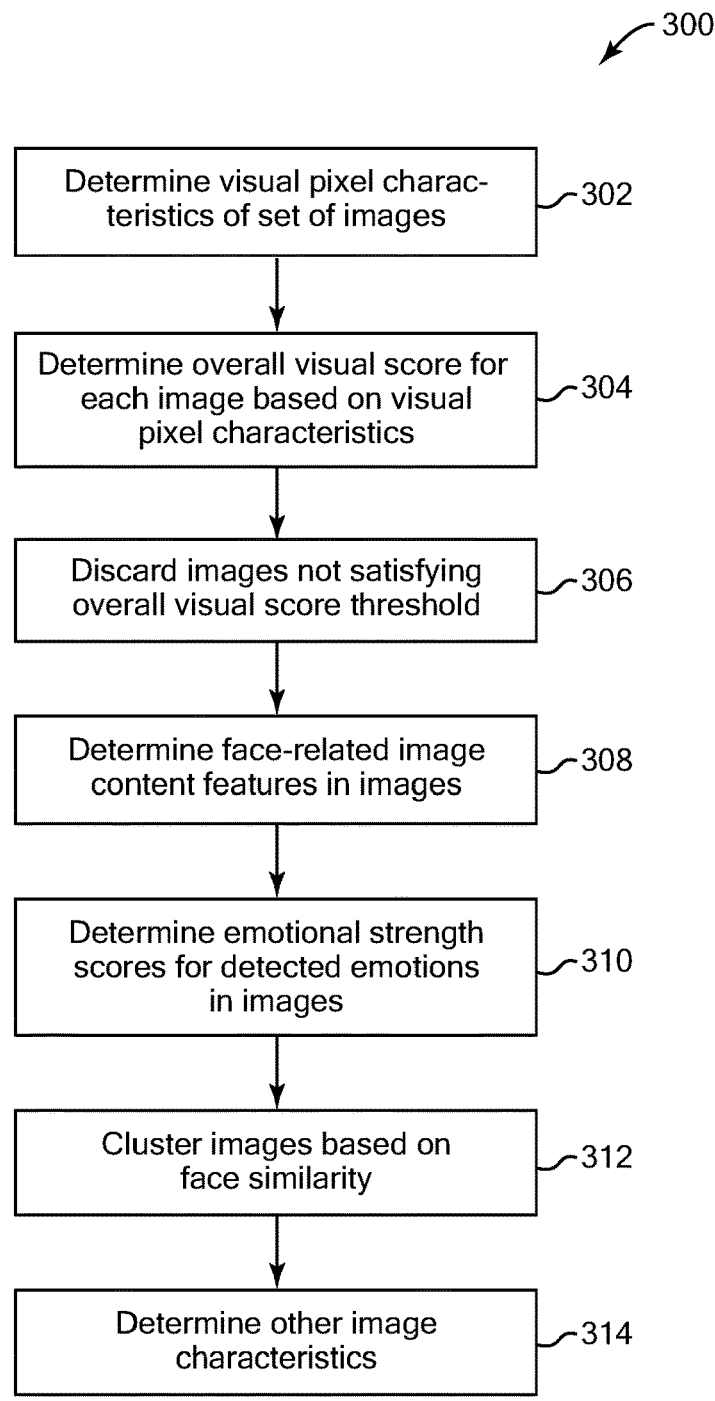
FIG. 3 is a flow diagram illustrating an example method to process a set of images to determine image characteristics, according to some implementations.

FIG. 3 is a flow diagram illustrating an example method 300 to process a set of images to determine image characteristics, e.g., for block 208 of FIG. 2. Other methods can alternatively be used for block 208.

In block 302, visual pixel characteristics of the set of images are determined. As referred to herein, visual pixel characteristics can be determined for pixels of the image or portions thereof, and can include characteristics including one or more of image or pixel brightness, sharpness, tint, contrast, saturation, color noise, color, color gamut (e.g., total range of colors present in the image), color distribution in the image (e.g., using or creating histograms), whitebalance, etc. Such characteristics can be determined for each image in the set of images to be processed. In some implementations or cases, some or all of the characteristics may have been previously determined and can be retrieved as visual pixel characteristic data from a storage device, e.g., as metadata of the images or otherwise associated with the images.

In block 304, an overall visual score is determined for each image in the set based on one or more of the visual pixel characteristics. For example, in some implementations the overall visual score can be a value within a predetermined numerical range indicating whether the image has generally desirable visual characteristics for general viewers. In some examples, the overall visual score can be determined based on individual scores for the visual pixel characteristics. For example, an individual score for image brightness, a different individual score for sharpness, etc., can be determined, for each visual characteristic desired to contribute to the overall visual score. In some implementations, individual score thresholds can be used, such that if a visual characteristics does not satisfy the threshold, it is given a penalty score or drastically reduced score, is not counted in the overall visual score at all, or has another effect.

In block 306, images in the set are discarded that do not have overall visual scores that satisfy an overall visual score threshold. For example, these images can be determined to be not of high enough quality to be included in the visualization provided by the method 200. The set of images resulting from block 306 thus can include only images that have qualified based on their overall visual scores. Other implementations can omit the filtering of images based on overall visual quality score.

In block 308, face-related image content features are determined by the system in the set of images resulting from block 306. In some examples, faces are detected in the images by determining pixel characteristics of pixels of the images (e.g., color, textures, etc.) and using image recognition techniques including facial recognition techniques to detect faces based on the determined pixel characteristics. A variety of such techniques can be used, including machine learning based on training images depicting faces, edge detection and comparison of image regions to stored reference face images, examination of pixel characteristics to find facial landmarks such as eyes, eyebrows, nose, mouth, beard, beard type, and hair type in predetermined configurations and distances relative to each other, etc. Besides the location and extent of faces and facial landmarks in the images, other face-related features can also be determined by the system. For example, biological information can be estimated based on facial features, including gender or age (e.g., based on face and landmark shapes, facial hair, hair color and style, skin appearance, etc.).

In some implementations, the determined face-related features can include estimations of emotions expressed by detected faces in the set of images. Any component of the system can perform such estimations, e.g., a face-detection module, emotion detection module, etc. For example, the system can examine facial landmarks to determine how the landmarks are shaped and oriented with respect to each other, and/or examine the detected faces for other distinguishing characteristics that indicate a particular emotion is present. In some examples, the system can check for a mouth feature that has its endpoints higher than its middle portion, indicating a smile, and/or check for the appearance of teeth in the mouth feature to indicate an open-mouth smile or a closed-mouth smile. The system can also check for facial wrinkles in a pattern indicating a smile, e.g., around the mouth feature. Similarly, endpoints of a mouth feature that are lower than a middle portion of the mouth feature can indicate sadness, consternation, or other emotion. A straight mouth feature can indicate a more neutral emotion. In other examples, the shape of eyes (e.g., squinting) may indicate laughter (happiness), and/or the tilt of the head or face (e.g., downcast face indicating sadness) may indicate sad emotions. The system can store a designation of one or more estimated emotions to be associated to each detected face in the set of images.

In block 310, in some implementations, the system can determine emotional strength scores for detected emotions in the set of images, where the emotional strength scores indicate a strength of the emotion detected. For example, the emotional strength score for a detected emotion of happiness can indicate very happy (e.g., a high score), moderately happy (e.g., a middle-range score), and slightly happy (e.g., a low score). In one example, the system can provide a confidence score for a detected emotion that indicates the degree of confidence by the system that the detected emotion is present. This confidence score can be used as an emotional strength score. For example, the confidence that the system has in detecting a particular emotion can also indicate the strength of the emotion, since stronger emotions are easier to detect (e.g., larger smile, and/or other clearly detected facial characteristics indicating a smile). In another example, the system can assign an emotional strength score based on an estimate of emotional strength of the detected emotion derived from directly measuring detected facial features and comparison measurements to predetermined indications of strength of emotions. For example, a measured distance or angle between upturned endpoints of a mouth feature and the middle section can be compared to a predetermined stored lookup table that assigns a strength score based on a variety of such distances or angles. The emotional strength score can be adjusted based on whether other facial features have been detected which indicate the detected emotion. For example, particular wrinkles in the face, squinting or closed eyes, appearance of teeth, etc. can cause an emotional strength score to be increased for a detected "happiness" emotion in a face. The emotional strength scores can be stored in association with the detected emotions for the associated faces and in association with the images in which they were detected.

In block 312, the images in the set can be clustered based on detected face similarity. This allows detected faces that are likely to depict the same person to be clustered together, such that each cluster can be associated with a particular person. For example, a first face detected in one image can be assigned an identification internal to the system, such as ID 1. A second face detected in another image can be found to be similar to the first face, and if the similarity is high enough (e.g., over a pixel similarity threshold), then the second face can also be assigned the identification ID 1. In this example, images having the ID 1 can be clustered together in a particular group. In some implementations, one or more of these images can also be included in one or more other groups, e.g., if these images depict other persons and different groups cluster images of those persons.

In block 314, in some implementations, other image characteristics can be determined by the system, e.g., for use in determining and generating a visualization in method 200. For example, other types of features can be detected in the image based on image recognition techniques, including objects (e.g., animals, articles, vehicles, etc.), landmarks (e.g., Eiffel Tower), weather (e.g., rainy, sunshine, etc.), landscape features (e.g., sky, clouds, hills, trees, buildings, etc.), indoor or outdoor location where the image was captured (e.g., based on brightness, presence of sky, etc.), and other types of image features. Such features can be detected using a variety of known techniques, e.g., using machine learning and/or comparisons of colors, edges, shapes, textures, and other image characteristics found in an image to known reference patterns or images. In some examples, stored metadata of the images can be examined by the system to determine image characteristics. Such metadata can include characteristics such as time of capture and/or modification of an image (e.g., stored timestamps), camera settings and information (e.g., focus and exposure settings, camera make and model, etc.), geographic location at which the image was captured, and/or tags created by a system or user to describe content of the image (e.g., names of persons, locations, landmarks, events, etc.). In some implementations, user data may be available to the system if user consent has been provided, including user calendar data, activity data, social networking data, etc., which can be correlated with image metadata to determine additional characteristics about an image (e.g., an event at which an image was captured).

In some implementations that determine image characteristics in videos, a feature found in one video frame can be tracked across multiple successive frames and assumed to be the same in the multiple successive frames, e.g., using optical flow and/or other techniques to estimate how particular pixels move between frames. Detected characteristics determined for one frame can be shifted in position within successive frames based on such tracking and used without having to determine image characteristics from the beginning of the process.

Figure 4:
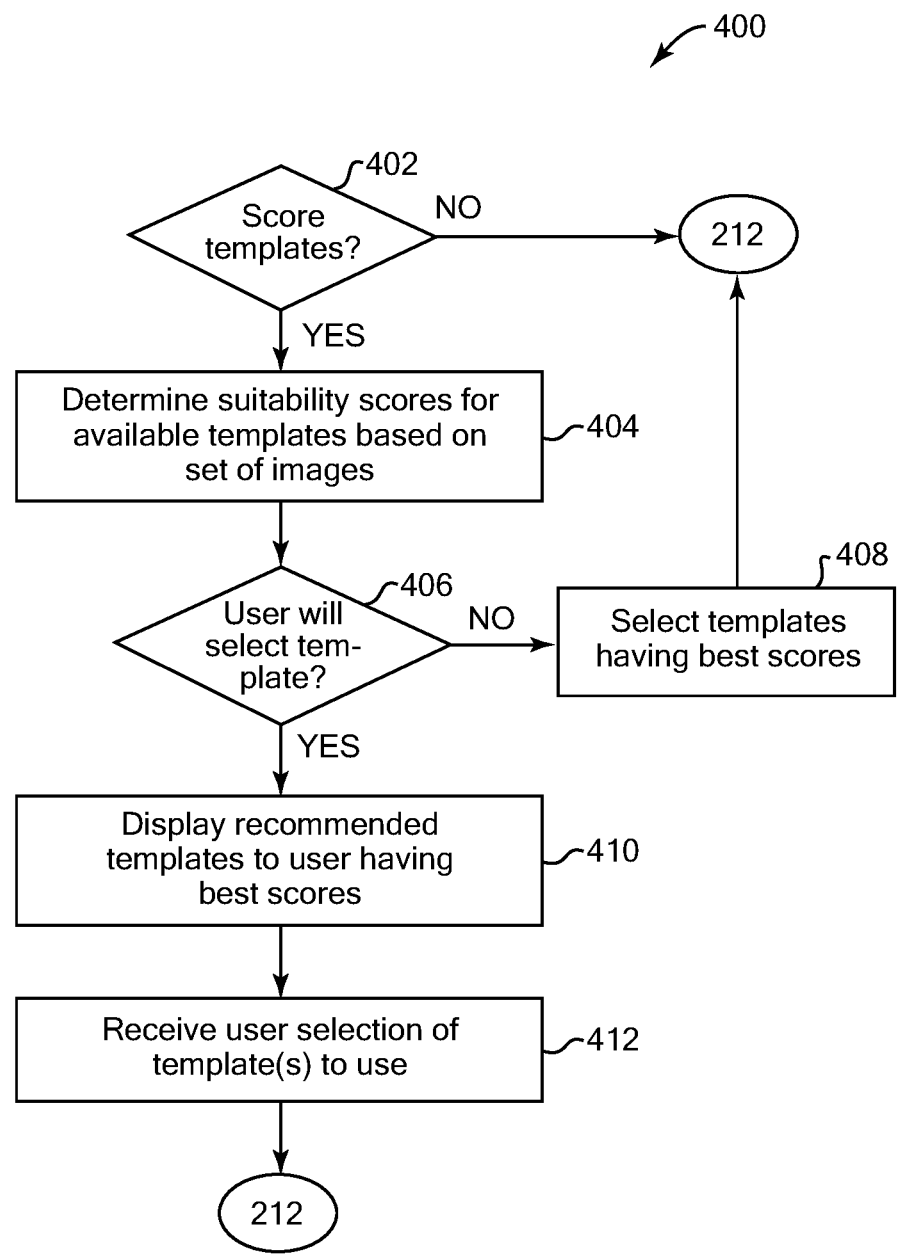
FIG. 4 is a flow diagram illustrating an example method to determine one or more templates to control the selection of images for the visualization, according to some implementations.

FIG. 4 is a flow diagram illustrating an example method 400 to determine one or more templates to control the selection of images for the visualization, e.g., for block 210 of FIG. 2. Other methods can alternatively be used for block 210. A number of different template types are described in method 400 as examples. Other template types can be available and scored in other implementations.

In block 402, a determination can be performed whether templates are to be scored to determine one or more templates for use. For example, in some cases or implementations, one or more previously-selected templates (e.g., selected by the user, system, or other entity) or default templates are to be used to select images, and no template scoring is needed. In some implementations, multiple templates may be available, e.g., stored in local or remote storage, and one or more templates can be selected for use in a particular iteration or instance of method 400. Some implementations can output options by a device to a user and request that the user select one or more displayed options to select particular templates for use with the set of images or with any set of images. Some implementations can use one or more default templates that have been previously selected for use, e.g., by a user or system. In such cases in which templates need not be scored, the method continues to block 212 of FIG. 2 to select images based on the selected templates.

If block 402 determines that templates are to be scored to determine one or more templates for use, the method continues to block 404, in which suitability scores are determined for multiple templates that are available for use. For example, available templates may be stored in accessible storage. A suitability score for a template indicates the suitability of that template to provide a visualization for a particular set of images or subset thereof. Block 404 can determine suitability scores based on the set of images obtained in block 206 of FIG. 2. For example, each available template can be scored based on a set of template scoring image characteristics that is associated with the template. For each available template, the set of images can be examined for the associated image characteristics to score the suitability of that template. Some examples of scoring available templates based on image characteristics in the set of images are described below with respect to FIG. 5.

In block 406, it is checked whether a user will select one or more templates for use, e.g., in response to being prompted and/or provided with options for selection, e.g., via a display or other output. Some implementations can allow the user to select one or more of the determined and scored templates to use for the set of images. In some cases or implementations, the system can select one or more scored templates without user input. Some implementations can both receive one or more template selections from the user and select one or more templates without user input, where all the template selections are used in selecting images.

If the system is to select one or more templates without user input, block 408 can be performed. In block 408, one or more of the available templates having the best suitability scores are selected. For example, the available templates were scored in block 404 to indicate the suitability of each template for providing a visualization for the set of images obtained in block 206. The best scores indicate the associated templates that have been determined to be best suited to the set of images out of the available templates. In one example, block 408 may determine that the set of images depict multiple faces in most of the images of the set (e.g., greater than a percentage or threshold number of images), and therefore templates that select images based on number of faces are assigned a favorable score (e.g., a high score in a predetermined number scale). In a further example, block 408 may determine that the set of images depict few emotions having an emotional strength score over a particular threshold, and therefore templates that select images based on strong depicted emotions in images are assigned a disfavorable score, e.g., lower score. In some implementations, a single template can be selected in block 408. In other implementations or cases, multiple templates can be selected. For example, a predetermined number of highest-scoring templates can be selected, or all templates can be selected that score over a particular score threshold. The method then continues to block 212 of FIG. 2 to select images based on the selected template(s).

If the user is to select one or more scored templates, e.g., as determined in block 406, block 410 can be performed. In block 410, one or more recommended templates are displayed (or otherwise output) to the user by a device, e.g., as selectable elements displayed in a user interface. For example, the recommended templates can have the best of the suitability scores determined in block 404. Similarly as described for block 408, the templates having the best scores can be displayed to the user, e.g., by a client device or other device used by the user. In some implementations, templates having a suitability score over a particular threshold can be determined and displayed as recommended templates. Some implementations can display a predetermined number of the best scoring templates, e.g., the top scoring template, or three top scoring templates. Some implementations can recommend selecting combinations of templates, e.g., a combination of two or more templates that have all scored well based on image characteristics of the set of images.

In block 412, user selection of one or more of the recommended templates is received. For example, user input can be received at a device to select one or more displayed elements representing recommended templates. In some examples, the user can provide touchscreen input to a user interface (e.g., select boxes, highlight selections, etc.), input voice commands and selections, etc. The method then continues to block 212 of FIG. 2 to select images based on the selected template(s). In some implementations, both blocks 408 and 412 may be performed to select different and multiple templates for use.

Figure 5:
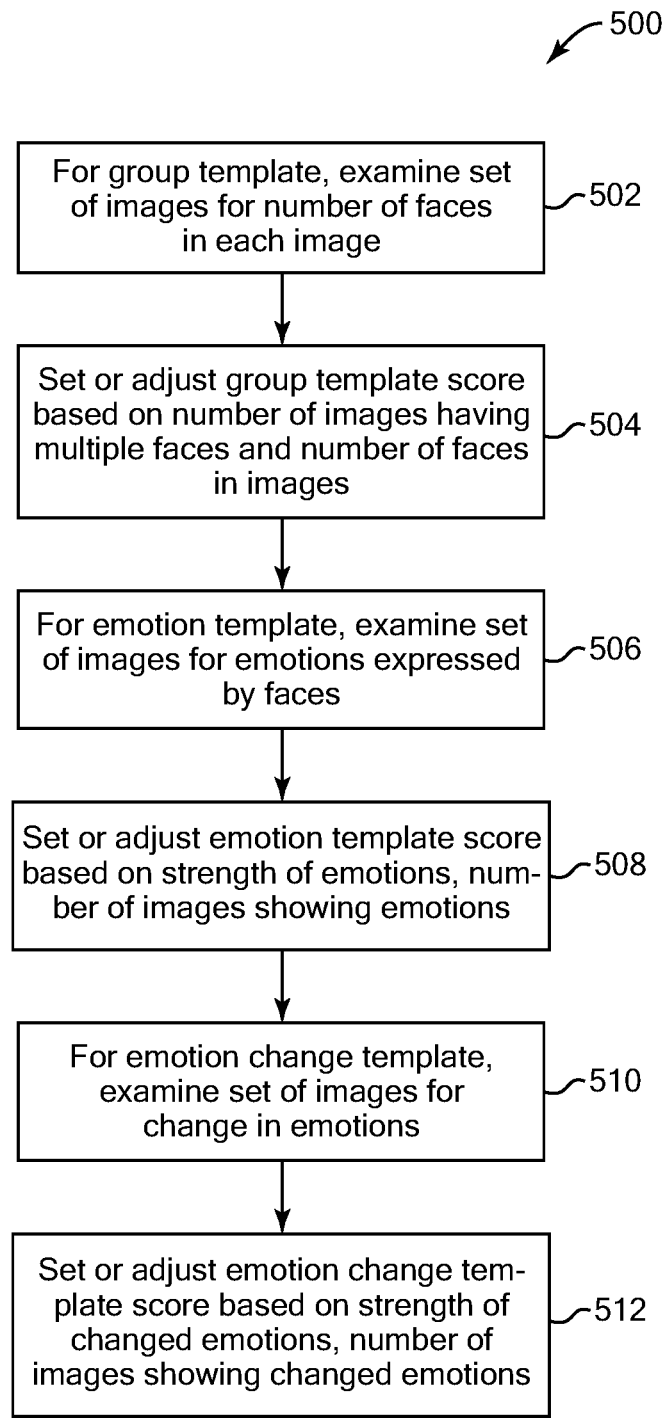
FIG. 5 is a flow diagram illustrating an example method to determine suitability scores for templates based on the set of images, according to some implementations.

FIG. 5 is a flow diagram illustrating an example method 500 to determine suitability scores for templates based on the set of images, e.g., for block 404 of FIG. 4. Other methods can alternatively be used for block 404. A number of different template types are described in method 500 as examples. Other template types can be available and scored in other implementations. In examples below, a score can be determined for each template based on a frequency (e.g., number of images having a characteristics) or strength (e.g., magnitude of emotional score) of one or more characteristics for the associated template as detected in the set of images. In addition, the order of blocks shown in FIG. 5 is one example, but the blocks need not be performed in the described order. For example, the blocks can be performed in a different order, at least partially simultaneously, and/or independently of each other where appropriate.

Block 502 can be performed if a group template is available for use by the method 200 of FIG. 2. A group template provides instructions to select images for a visualization that depict groups of multiple persons (e.g., multiple faces). For a group template, block 502 examines the set of images to determine the number of faces in each image and/or the number of images having multiple faces. For example, image and facial recognition techniques can be utilized to determine if faces are present and how many faces are present in each image. In some implementations, block 502 can retrieve and examine stored data resulting from the extraction of image characteristics by method 300, or from another method that has provided data describing detected faces in the images. For example, method 300 may have detected faces and stored data indicating the number of faces detected in each image of the set.

In block 504, the group template score that is associated with the group template is set or adjusted based on the number of images found in block 502 that include multiple faces. In one example implementation, the percentage of images (relative to the entire set of images) having multiple faces can be provided as or converted into an equivalent group template score. For example, if it is determined that 55% of the images in the set depict multiple persons, then this percentage can be converted into a group template score in the used range of template scores. The number of faces in an image that will contribute to the score can vary in different implementations, e.g., two or more faces, three or more faces, etc. Some implementations can increase the contribution by an image to the group template score in correspondence with the number of depicted faces in that image. For example, an image depicting four faces can contribute a greater amount to the group template score than an image depicting two faces. Some implementations can adjust the group template score based on more specific template instructions, e.g., similar to the criteria of the group template for selecting images for the visualization. For example, a template score can be adjusted based on the number of images in the set having multiple faces and depicting at least one different face than depicted in the other images of the set, with a better score for more images meeting those conditions.

Block 506 can be performed if an emotion template is available for use by the method 200 of FIG. 2. An emotion template provides instructions to select images for a visualization that depict emotions in faces. For an emotion template, block 506 can determine which images in the set depict emotions, e.g., based on image characteristics determined in method 300 of FIG. 3 described above. In some implementations, only images having a strength or confidence level of detected emotion that satisfy a particular threshold will contribute to the emotion template score.

In block 508, the emotion template score that is associated with the emotion template is set or adjusted based on the emotions found in the images in block 506. In one example implementation, the emotion template score is based on the strength of emotions found in the set of images. For example, a higher template score can result from having a higher number of images in the set that depict one or more strong emotions, e.g., emotions having an emotional strength score satisfying a particular template score threshold. A lower template score can result from having zero or a smaller number of images depicting one or more strong emotions. In some implementations, the higher the strength of emotion depicted in an image, the greater the contribution of that image to the emotion template score. Some implementations can contribute a higher amount to the emotion template score for an image having more faces depicting emotions than an image having fewer faces depicting emotions (e.g., independently of the strength of the depicted emotions).

Block 510 can be performed if an emotion change template is available for use by the method 200 of FIG. 2. An emotion change template provides instructions to select images for a visualization that depict changes in emotions of faces. For an emotion change template, block 510 determines which images in the set may depict a change in emotions. For example, a sequence of images can be examined to detect this change, where the sequence of images can be frames in a video, a series of still photographs (e.g., captured close in time in sequence as in a burst mode of a camera), or other series of photographs. The system can look for a change in emotions from one type of emotion to another type (e.g., from happiness to sadness or vice-versa), or for a change in strength of a single particular emotion (e.g., from slight happiness to strong happiness). Changes in emotion can be detected by checking the emotional strength scores, e.g., determined as described for FIG. 3, that occur in sequences of images in the set of images. The changes in emotion can be indicated for each image in the set, e.g., as a score indicating a difference between beginning and end emotion states, or other score. Some implementations can indicate the time range in which the change in emotions has occurred, the time occurring between successive images, etc. Some implementations can indicate whether (or the extent to which) examined images have a visual similarity to each other, e.g., be within a threshold similarity in pixel values.

In block 512, the emotion change template score that is associated with the emotion change template is set or adjusted based on the emotion changes found in the images in block 510. In some example implementations, the emotion change template score is based on the number of qualifying emotion changes found in the set of images as detected in block 510. For example, a larger number of detected emotion changes provides a higher score than a lower number of detected emotion changes. Some implementations can contribute an amount to the score that is proportional to or otherwise based on amount of change in emotion. Qualifying emotion changes can be emotion changes that are over a threshold change and/or occur within a threshold time period, occur in images that are visually similar and/or in images that were captured close in time (e.g., under a threshold time period of each other), etc. Some implementations can treat all emotion changes equally in contributing to the template score, regardless of the magnitude of emotion change.

Other types of templates can be used in other implementations, where each such type of template can have its associated template score determined based on the set of images, e.g., based on the number and/or the strength of characteristics appearing in the set of images that are relevant to that particular template for selection of images for a visualization.

Some implementations can also consider other image characteristics that can contribute different amounts to the template score for a particular type of template. For example, locations of faces or other objects within the borders of an image can contribute different amounts to the template score. In one example, an emotion template score can be influenced by a greater amount if detected faces are positioned close to the center of an image, while a group template score may not be influenced by face position since faces of persons in groups can be positioned throughout an area of an image. In some implementations, user preferences or settings can indicate which particular types of content or identities of persons or objects that may contribute larger amounts to the template scores than other types of content or identities. In another example, a user can indicate that the depiction in the images of the user's family members can contribute a lesser amount to a group template score than depiction of non-family persons, because the user prefers to view visualizations of groups that include some non-family persons.

Figure 6:
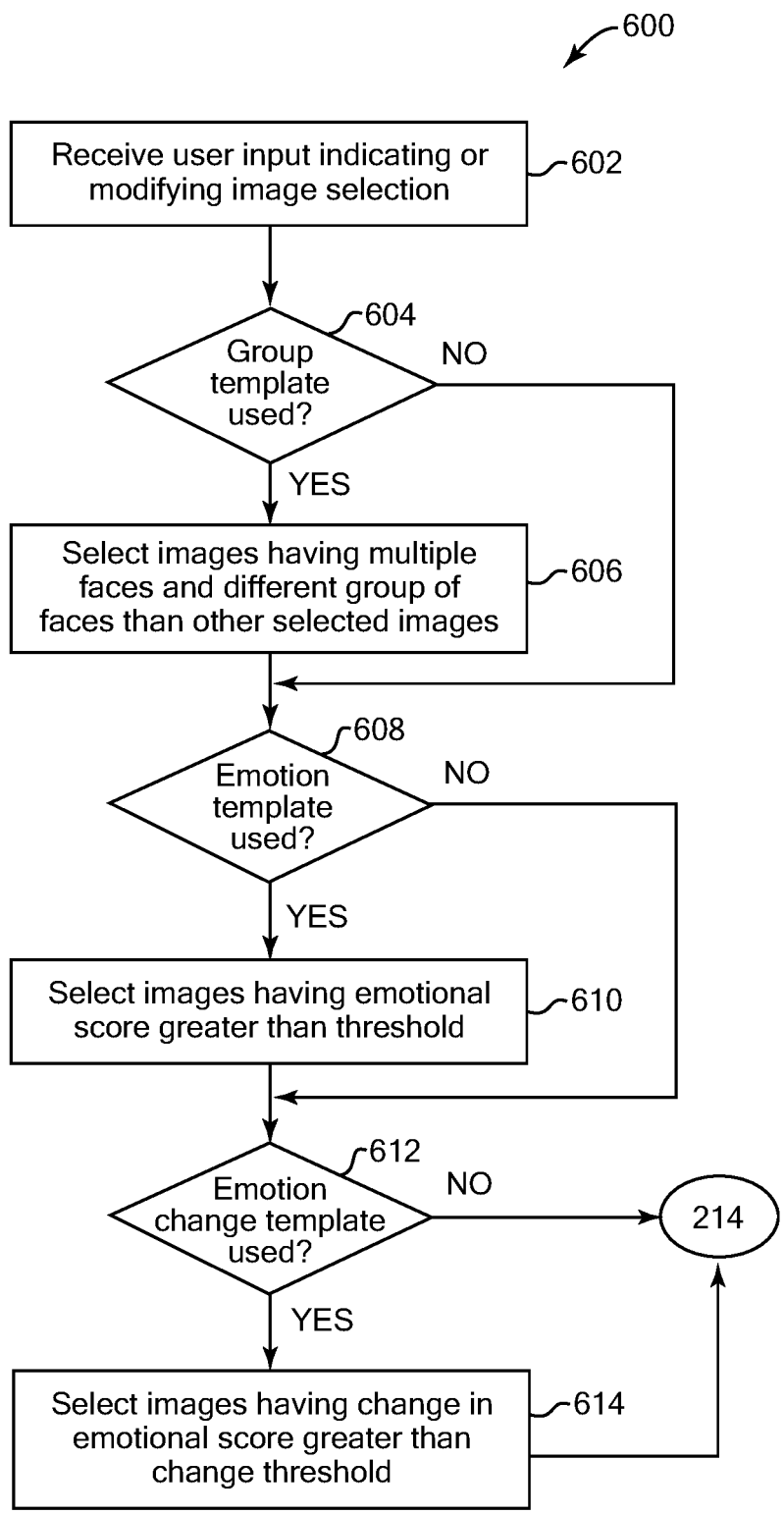
FIG. 6 is a flow diagram illustrating an example method to select images from a set of images based on criteria specified in one or more templates, according to some implementations.

FIG. 6 is a flow diagram illustrating an example method 600 to select images (e.g., a group of images) from a set of images based on criteria specified in one or more templates, e.g., for block 212 of FIG. 2. The order of blocks shown in FIG. 6 is one example, but the blocks need not be performed in the described order. For example, the blocks can be performed in a different order, at least partially simultaneously, and/or independently of each other where appropriate. Other methods can alternatively be used for block 212.

Templates described herein can be implemented in any of various ways. In some examples, a template process can receive input indicating or identifying the set of images and associated metadata for the set of images (e.g., metadata describing characteristics such as faces and/or other objects depicted in the image, locations of objects in the image via coordinates or predefined areas, etc.). In some implementations, a template process can store scores used in determining which of the images to select for the template (e.g., better scores for images that better satisfy the template's criteria), and/or can store determined scores for particular combinations of images that are to be selected (e.g., a sequence of images showing a change of emotions as in blocks 612 and 614 below). The template can store such information in associated storage, e.g., in a data structure of the template. The template can select, based on tracked scores, images or image combinations and determine the order of these images in the visualization.

In block 602, user input can be received in some implementations that indicates or modifies image selection. For example, the user input can modify one or more templates designated to select images for the visualization. In some examples, this user input can be different than user template selection described for FIG. 4. For example, a prompt or menu can be displayed on a user device that presents options to modify the particular image characteristics that a particular template (or all templates) requires to be present in selected images. In various examples, the user input can add, delete, or modify existing image characteristic criteria of a template. For example, the user input can further specify particular image characteristics required by a template. In an example, the user input can indicate which particular emotion(s) are to be present in the selected images determined based on an emotion template. In another example, the user input can indicate which persons, type of persons, number of persons, etc. are to be present in the selected images determined based on a group template, emotion template, and/or emotion change template. In some implementations, the user input can specify other particular parameters or requirements for selecting images, e.g., one or more particular time periods in which images were captured, particular geographic locations or social events at which images were captured, a particular user, camera, and/or device that captured the images, etc.

In block 604, it is determined whether a group template has been designated to select images for the visualization. For example, a group template may have been determined in block 210 of FIG. 2. If not, the method continues to block 608, described below. If a group template is used, then in block 606 one or more images are selected from the set which qualify under the criteria of the group template. In this example, the group template instructs that images in the set that depict multiple faces are to be selected. In other implementations, the group template can instruct that images of the set that depict at least a particular number of faces are to be selected, e.g., three faces, five faces, etc. Other sizes of face or person groups can be specified for selection in the template. Some implementations (or types) of group templates can instruct to select images that depict at least one full person (e.g., not just faces), or at least a particular percentage of the body of a person or all depicted persons (e.g., at least a torso or more of the persons, as detected based on detection of body appendages, distances based on face proportions, etc.).

In some implementations, as shown in block 606, a group template can additionally specify that each selected image should depict a different group of multiple faces than depicted in other selected images. For example, a different group of faces can be defined as a group of faces that is different than the groups of faces in the other images, including fewer faces or more faces (e.g., a subset or a superset of a group can be a different group). Some implementations can require that each group of faces have at least one different face than the other groups of faces in the other selected images. Some implementations can instruct to maximize the number of different faces in the group of selected images. Such criteria cause facial and group diversity to be provided in the group of selected images.

Other criteria can also be used for the group template in various implementations. For example, template criteria can instruct to determine which person (e.g., face) most frequently appears in the set of images, and to select at least one image depicting that person. For example, extracted face-related features determined in block 208 (e.g., clustered similar faces assigned the same identifier as described for FIG. 3) can be used to determine the frequency of appearance of particular faces. Some group template implementations can select images that depict faces having at least a particular frequency of appearance (e.g., faces that appear in at least a particular number of images or appear in at least a particular percentage of all images depicting faces). Some group template implementations can select images that depict faces having below a particular frequency of appearance. In some implementations, the group template can specify that a particular number of images are to be selected for the visualization. In some implementations, a template can require that selected images should depict faces that are positioned in one or more particular locations of an image (e.g., within a particular percentage area around the center of the image), should be greater in size than a specified threshold size (e.g., a percentage area of the image area), should have particular visual or content characteristics (e.g., all facial landmarks should be visible in each qualifying face), and/or should have other image characteristics. In some implementations, a template can require that selected images should depict family members of the user, and/or persons well-known to the user, which can be determined (with user consent) via user data including social networking data, if available. The method then continues to block 608.

In block 608, it is determined whether an emotion template has been designated to select images. If not, the method continues to block 612, described below. If an emotion template is used, then in block 610 one or more images are selected from the set which qualify under the criteria of the emotion template. For example, an emotion template can specify to select images depicting faces showing the strongest emotions in the set of images. In some examples, images can be selected that depict faces showing emotions having an emotional strength score greater than an emotional score threshold. For example, the emotional strength scores can be determined in block 208 and described in FIG. 3, e.g., based on pixel characteristics (including appearance, layout, and/or orientation of facial features such as mouths, eyes, etc.). In various examples, a particular number of images can be selected which show such emotions (e.g., the images having the best emotional scores), or a larger number (e.g., all) the images above the emotional score threshold can be selected.

Some implementations can provide criteria as to whether the selected images from the set should only depict a single person, should only depict a particular specified number of persons, or can depict any number of persons. Some implementations can output a prompt to user via a device as to how many persons are desired to be shown in the selected images of the visualization. If only images depicting a single person are to be selected, and if multiple qualifying people showing emotions are present in the set of images, then the person selected can be based on various characteristics. For example, one or more such characteristics can include the most frequently appearing person, the person showing the strongest emotion, the person showing a particular specified emotion, etc. Other criteria can also be used, e.g., similarly as described above for group templates. The method then continues to block 612.

In block 612, it is determined whether an emotion change template has been designated to select images. If not, the method continues to block 214 of FIG. 2 to generate a visualization. If an emotion change template is to be used, then in block 614 one or more images are selected from the set which qualify under the criteria of the emotion template. For example, an emotion change template can specify to select images showing a change in emotions over multiple images. For example, a sequence of images in the set can be examined to detect this change, where the sequence of images can be frames in a video, a series of still photographs (e.g., captured close in time in sequence as in a burst mode of a camera, as indicated by their timestamps), or other series of photographs.

In some implementations, the emotion change template criteria can specify to select image sequences showing a change in emotions that satisfies (e.g., is equal to or greater than) a change threshold. Detecting images showing a change in emotion may be used as an indicator that something interesting has occurred to cause the change, as captured in the images. For example, a system can check the magnitude of change in emotional strength scores that occurs between one image and a later image in a sequence of images. For example, the emotional strength scores can be obtained from stored image characteristics of FIG. 3. In one example, a difference in emotional strength scores can be determined between the beginning and end images of the examined sequence of images. In some implementations, template criteria can specify that the change from one emotion to the other should be continuous and not interrupted by other emotions. In some implementations, template criteria can specify that images depicting a change in emotions from one type of emotion to another type are to be selected. For example, the system can check for a change from happiness to sadness or vice-versa. In some implementations, template criteria can specify that images depicting a change in strength of a single particular emotion are to be selected. For example, the system can check for a change from slight happiness to strong happiness in various sequences of images in the set of images. Various combinations of these criteria can be used in a single template.

Some implementations can impose a restriction that a selected sequence of images should provide the change in emotions within a particular time range, e.g., within a range of successive images (e.g., frames) occurring over the particular time range. For example, the system can select image sequences depicting more immediate or abrupt changes of emotions, and can ignore image sequences depicting gradual changes in emotions that have the requisite threshold change in strength of emotions over a time frame that is greater than a threshold amount of time. In some implementations, a requirement can be imposed that successive images in a selected sequence were captured within a predetermined amount of time of each other. Other implementations can avoid such a requirement. Some implementations can impose a requirement that the images in a selected sequence have a visual similarity to each other, e.g., be within a threshold similarity in their pixel values, to indicate that the setting or scene depicted during the change in emotions did not change significantly. Other criteria can also be used, e.g., similarly as described above for group templates and/or emotion templates.

If a qualifying portion (e.g., clip) of a video is found, that portion can be extracted from the video and indicated to be selected images. After block 614, the method continues to block 214 of FIG. 2 to generate a summary visualization.

Other types of templates can be used to select images in various implementations, e.g., to select images and provide visualizations providing particular image characteristics and/or expressing various themes or ideas via images similarly to the group and emotion themes described above. For example, one or more templates can be provided to select images depicting particular types of image features, e.g., animals, vehicles, other objects, landscapes, etc. A template can select particular facial characteristics of faces depicted in images, such as facial hair (e.g., particular types of hairstyles, beards, etc.), jewelry, tattoos, or other person characteristics (e.g., estimated gender, age, height, type of clothes, etc.). In another example, a centering template can select images that depict faces or other image features having a position close to the center of an image, e.g., within a threshold area surrounding the center of an image. Such centering selection criteria can also be added to any suitable template, e.g., an emotion template.

In additional examples, an action template can select images (e.g., still photos or video clips) portraying motion in a sequence of frames or still photographs, e.g., as detected in the set of images based on optical flow and other motion detection and tracking techniques over multiple successive images. A time template (or time criteria used in any type of template) can select images based on diversity of the times of capture of the images, e.g., requiring a minimum and/or maximum time period between the images selected, a minimum and/or maximum total time period covered by the group of selected images, etc. Similarly, a location template (or location criteria) can select images based on the geographic location of capture of the images as determined from geographic metadata of images obtained during image capture. For example, location criteria can include a minimum and/or maximum geographic distance between locations of capture in the group of selected images, a requirement of diversity or difference in the visualization for cities, countries, or continents as locations of image capture, etc. Other types of templates can be based on checking for criteria for selection of images based on image characteristics described in standard image metadata of the images, including number of pixels, compression mode, shutter settings, color space, etc. Some implementations can check for criteria including particular audio corresponding to particular images (e.g., frames) in a video or other image sequence. For example, particular spoken words, clapping or applause, a bell, or other sounds can indicate to select images after, during, and/or before the particular sound(s).

Some implementations can allow a user to create his or her own templates. For example, image characteristic options can be displayed and user input received specifying particular image characteristics for image selection. The specified image characteristics can be provided as criteria in a customized template to select images from a set of images.

Some implementations can allow multiple templates to select images. For example, a group template and an emotion template may have been designated to select images from the set of images for the visualization. In some implementations, images that satisfy criteria of any one template can be selected for inclusion in the visualization. Some implementations can select only images that satisfy all criteria of the designated templates used to create the visualization. In some examples, if both a group template and an emotion template are designated for use, then only images having multiple faces and satisfying other criteria of the group template, as well as having sufficiently strong emotions and satisfying other criteria of the emotion template, are selected. Some implementations can provide rules for prioritizing and using particular template criteria of certain templates instead of other criteria of other templates, if multiple templates are designated for use.

Figure 7:
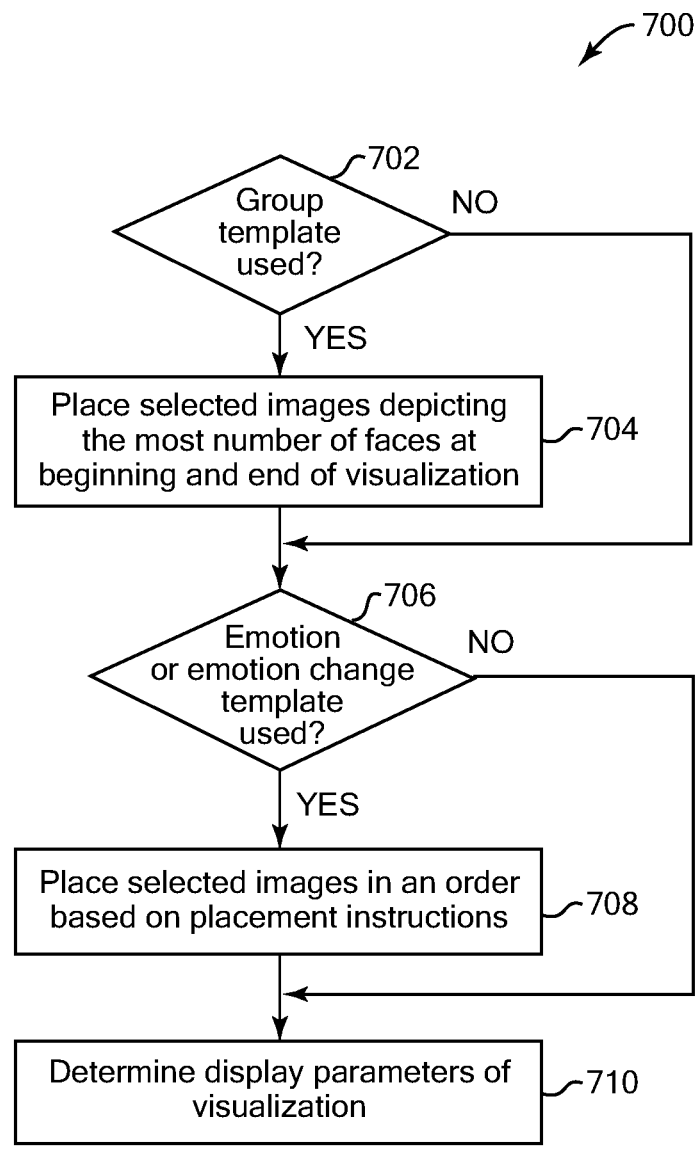
FIG. 7 is a flow diagram illustrating an example method to generate a visualization from selected images, according to some implementations.

FIG. 7 is a flow diagram illustrating an example method 700 to generate a visualization from selected images, e.g., for block 214 of FIG. 2. Other methods can alternatively be used for block 214. The described blocks are examples of processing selected images to create a visualization, and can vary in different implementations, e.g., omitting some blocks, adding additional blocks, etc. The described method determines a visualization that provides a sequence to the selected images, e.g., a movie or other video, or other type of display in a particular order by a display device. Other implementations can generate visualizations that may not include a sequence, may partially include a sequence, or may present the selected images in other ways.

In various implementations, the method can follow stored placement instructions (including criteria) for placement of the selected images in the visualization. In some examples, the template used to select the images can provide placement instructions for ordering the images within the visualization. In some implementations, the placement instructions can be alternatively or additionally specified in user preferences, system settings, default settings, etc.

In block 702, it is checked whether a group template was used to select the images for the visualization, e.g., in block 212 of FIG. 2. If not, the method continues to block 706, detailed below. If a group template was used, in block 704 the selected images depicting the most number of faces can be placed at the beginning and/or the end of the sequence of images provided by the visualization. By providing these images at the beginning, the visualization can display a larger number of persons in the visualization when the user has started viewing the images, thus attracting the user's attention. By providing these images at the end, the visualization can display a larger number of persons just before the visualization ends, thus providing a more engaging final experience by the user.

The images with the most faces can be placed according any of a variety of different methods. For example, the images in the set (or data describing the number of faces in the images) can be examined to determine the distribution of faces in the images, and to determine images that depict the largest number of faces. In some implementations, this group of images can be divided in half such that half of the images are placed at the beginning of the visualization and the other half is placed at the end of the visualization. In some cases, e.g., if there are only a few images having the most faces in the set, then a number of images depicting fewer faces can be placed at the beginning and/or end of the visualization, until a threshold total number of images are so placed.

In some examples, the order of the images placed at the beginning of the visualization can be any order, or can be based on user preferences, time of capture of the images, subject matter of the images, and/or other image characteristics. The order of the images placed at the end can be similarly determined.

In block 706, it is checked whether an emotion template and/or emotion change template was used to select the images for the visualization, e.g., in block 212 of FIG. 2. If not, the method continues to block 710, detailed below. If an emotion template or emotion group template was used, in block 708 the selected images are placed in the visualization in an order based on available placement instructions for the emotion template. In some examples, emotions can have an order of display based on placement instructions, e.g., an order of angry faces, sad faces, and happy faces. Some predetermined orders can divide up one type of emotion and place one portion of the images depicting that emotion in one place in the order, another portion of the images depicting that emotion in another place in the order, and so on. For example, images depicting happy faces can be split such that some of the happy face images are placed at the beginning of the visualization and some of the happy face images are placed at the end. If the template used was an emotion change template, then the image sequences showing the emotion change can be placed intact at particular places in the visualization sequence order according to placement instructions.

Other types of templates can also be checked to determine if such templates were used to select images for the visualization and to provide appropriate ordering of the selected images based on the type of template, e.g., similarly as the group template and emotion templates described above.

In block 710, display parameters of the visualization are determined. Display parameters can include timing of images to be displayed and/or the display sequence of images, e.g., final placement and order of selected images within the sequence of display for the visualization.

In some implementations, display parameters such as timing for the display of images can be determined. For example, any of a variety of different timing schemes can be applied to the visualization. In some examples, a timing scheme can be instructed in the template used to select the images. Some implementations can select a timing scheme based on previously-stored user preferences or current user selection of one or more timing schemes displayed on the user device. A timing scheme can indicate the duration of display of one or more images in the visualization. For example, a timing scheme can vary the duration of display based on the place of an image within the visualization sequence. In one example, images placed at the beginning of the visualization sequence are displayed longer, while images later in the sequence are displayed for a shorter time. For example, the duration can be correlated to the placement of the image in the visualization order, e.g., such that images at the middle of the visualization are displayed for a shorter time than images at the beginning, and images at the end of the visualization are displayed for a shorter time than the images at the middle.

In some implementations, the timing scheme can vary the time duration of display of images based on the content in the images. For example, the duration of display of an image in the visualization can be based on the number of faces, objects, landmarks, or other image features depicted in the image. In one example, the greater the number of faces and/or other image features detected in an image, the longer the image is displayed in the visualization sequence, e.g., to allow a user more time to view the detail of the image. In some examples, an image depicting one face can be displayed for less duration than an image depicting three faces.

In another example, the time duration of display of an image in the visualization can be based on the strength of one or more emotions shown in faces of the image as indicated by the emotional strength scores. For example, the stronger the emotion depicted in an image, the longer the display of the image. Some implementations can refer to stored user preferences, default settings, template instructions, or user input that indicates the display times and/or prioritizations of each particular type of content and/or particular identities (if known, and user consent is obtained). For example, faces can be displayed for longer time periods than other types of detected image features (landmarks, objects, landscapes, etc.). In another example, faces of particular persons well-known to the user, as determined by social networking connections (with user consent), can be displayed for longer durations than less well-known persons.

In some implementations, for example, each image can be associated with a minimum amount of time that it is displayed in the visualization, and the minimum display time can be increased based on one or more factors including those described above.

Selected videos for the visualization may already include their own timing (e.g., providing multiple frames to be displayed at a given rate). Some implementations, however, can vary the display rate of videos based on various criteria, examples of which are described herein (e.g., place in the visualization sequence, amount of objects or other detail detected in particular frames of the video, etc.).

Use of multiple templates, e.g., grouping of templates and selected images for use, can be performed in some implementations. A visualization can be generated based on multiple templates. For example, a first group of images can be selected based on template A from the set of images, and a second group of images can be selected based on template B from the set of images, and the two groups can be combined together to generate the visualization including both groups of images. In another example, a first group of images from the set of images can be selected based on template A, and a second group of images can be selected from the first group of images based on template B, where the second group of images is used to provide the visualization.

If multiple templates are used to select the images to include in the visualization, then the final placement of images in the visualization can be determined for images selected from such multiple templates. In some implementations, stored placement instructions can be followed to determine the placement of images in the visualization. In some examples, rules of priority can be provided in placement instructions, where each template is assigned a priority. In case of a conflict in placement instructions between two templates, the system can follow the instructions applying to the template having the higher priority and not the conflicting instructions of the lower-priority template. Some implementations can indicate an order that the placement instructions should be applied, e.g., by applying placement instructions for one template first, placement instructions for another template next, etc.

In one example, both a group template and an emotion template have been selected to be used to generate the visualization, such that the selected images for the visualization depict multiple faces and at least one face in each image shows strong emotions. Stored placement instructions indicate that the emotion template instructions should be applied first, followed by the group template instructions. For example, the emotion template instructions cause an equal number of happy face images to be placed at the beginning of the visualization and at the end of the visualization, with images having other emotions placed in a random order between those groups of happy face images in the visualization sequence. The group template instructions indicate to place the images such that half the images depicting the greatest number of faces are placed at the beginning of the visualization and the other half are placed at the end. The system applies these instructions to the group of images that have already been ordered according to the emotion template instructions. For example, if non-happy face images currently in the middle of the visualization sequence depict more faces than other happy face images, then the emotion template instructions are violated and these non-happy faces are placed at the beginning and/or end of the visualization according to the group template instructions. In some implementations, one or more previously-applied or lower priority template instructions can be followed as much as possible within the constraints of the template having greater priority or later application. For example, when applying the group template to provide a subset of images that have the most faces at the beginning of the visualization, the system can order the images within this subset so that happy faces are placed before non-happy faces in the visualization sequence.

In some implementations, more complex priorities and resolutions of multiple placement instructions can be applied. For example, specific placement instructions can be stored and applied for particular combinations of template types. In some implementations, user placement preferences can have priority over other placement instructions including default and template instructions.

Some implementations can provide the visualization as a summary of the set of images. In one example, the set of images is provided in a single video (e.g., movie), and one or more templates select images from the movie having characteristics forming a theme of interest to a user. The visualization can be a summary of different plot events and/or "character moments" in the movie, e.g., based on finding video frames or clips depicting action (e.g., a template specifying that motion must be present in selected image sequences), depicting emotions or showing change in emotions as described above, etc.

In some implementations, the visualization can be a shorter version of the original set of input images. For example, one or more portions or clips of a video can be selected and placed in sequence in the visualization to form a shorter video.

In some implementations, various effects can be added to the visualization and its display. For example, special effects (e.g., filters that change the tint or color of image pixels), text (e.g., text captions for spoken words added to images), audio (e.g., the audio track of video portions included in the visualization, and/or music or other sounds added to the visualization), etc. can be added over, alongside, and/or simultaneously to the display of at least some of the images of the visualization. In some implementations, the effects can be specified in display parameters stored in association with the visualization, and these effects can be selected by one or more templates controlling the template generation. Some implementations can render effects in the output of the visualization based on user preferences or other stored parameters.

In another example of adding effects, a template can select different groups of images, where a respective intermediate image is generated from multiple images in each group. For example, some or all of the images within a group can be blended and/or otherwise combined to form an intermediate image. These intermediate images can be combined into a final visualization, e.g., video or movie showing a sequence of the intermediate images. Annotations can also be added to the final visualization, e.g., text, audio data, images, icons, or other annotation content determined based on user input, stored user preferences, one or more templates that generate the visualization, etc.

In various implementations, the visualization data resulting from method 700 can be stored on one or more accessible storage devices. The visualization can be stored in any of a variety of formats, data structures, etc. For example, references or pointers to the selected images or videos in the visualization, with an indication as to order, time of display, and other parameters can be stored. During display, the display process can reference such pointers to access and retrieve the selected images from storage for display.

Various blocks and operations of methods 200-700 can be performed in a different order than shown and/or at least partially simultaneously, where appropriate. For example, some implementations can perform blocks of the methods at various times and/or based on events not related to providing images for display. In some implementations, blocks can occur multiple times, in a different order, and/or at different times or stages in the methods. One or more blocks can be divided into multiple blocks in various implementations.

Figure 8:
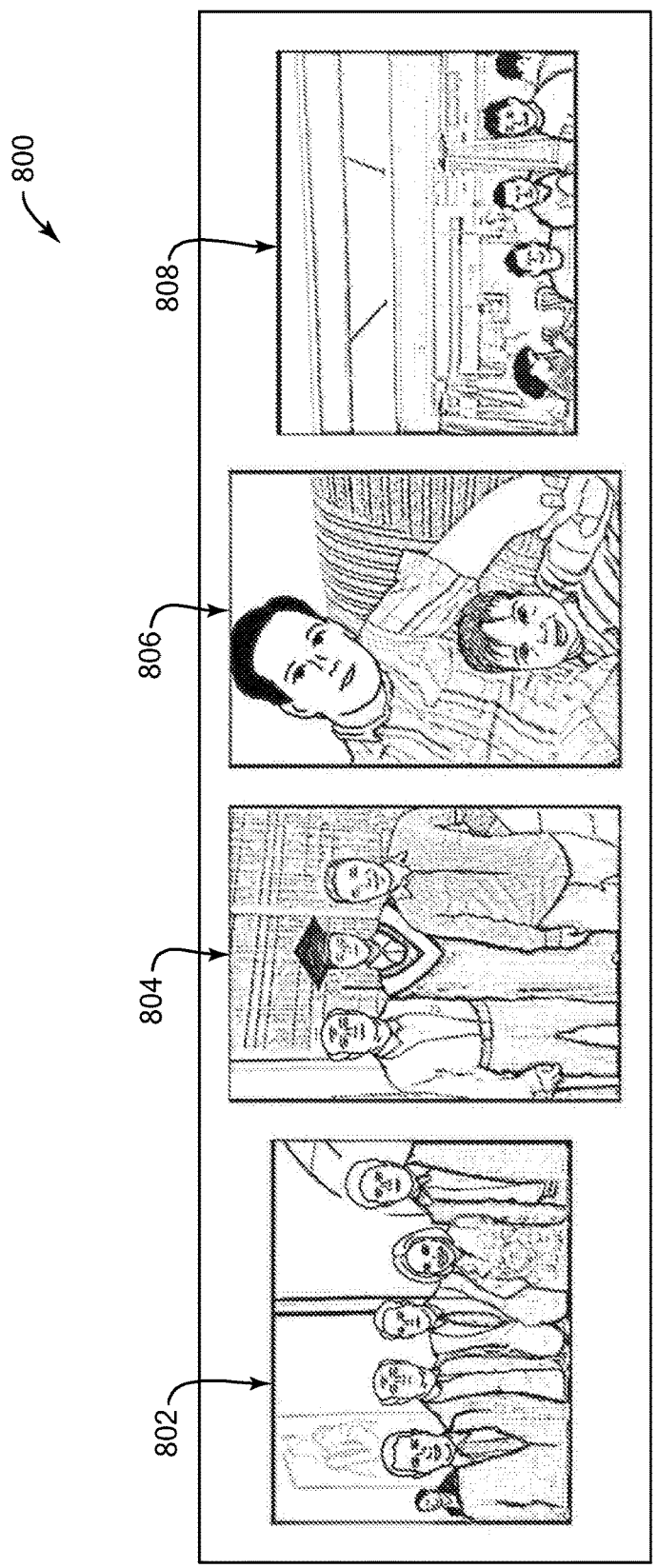
FIGS. 8-10 are diagrammatic illustrations of example representations of displayed visualizations determined from sets of images, according to some implementations.
Figure 9:
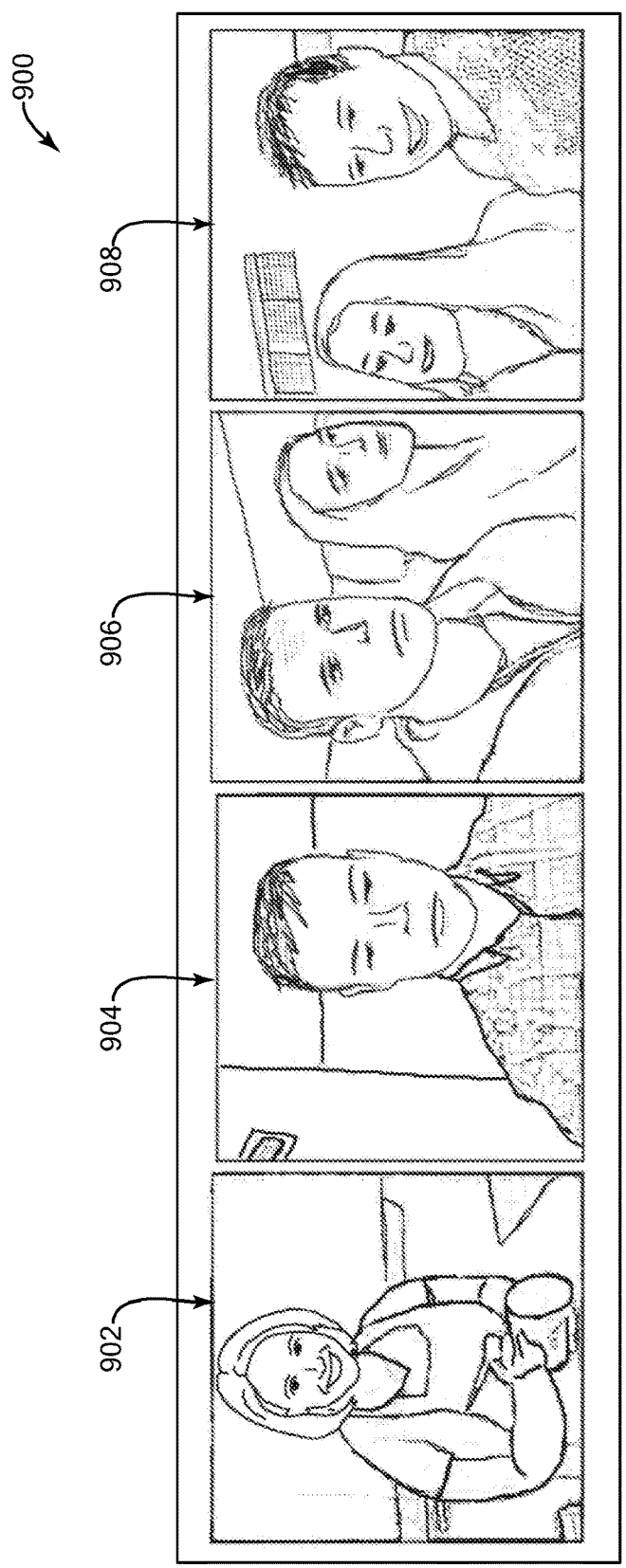
Figure 10:
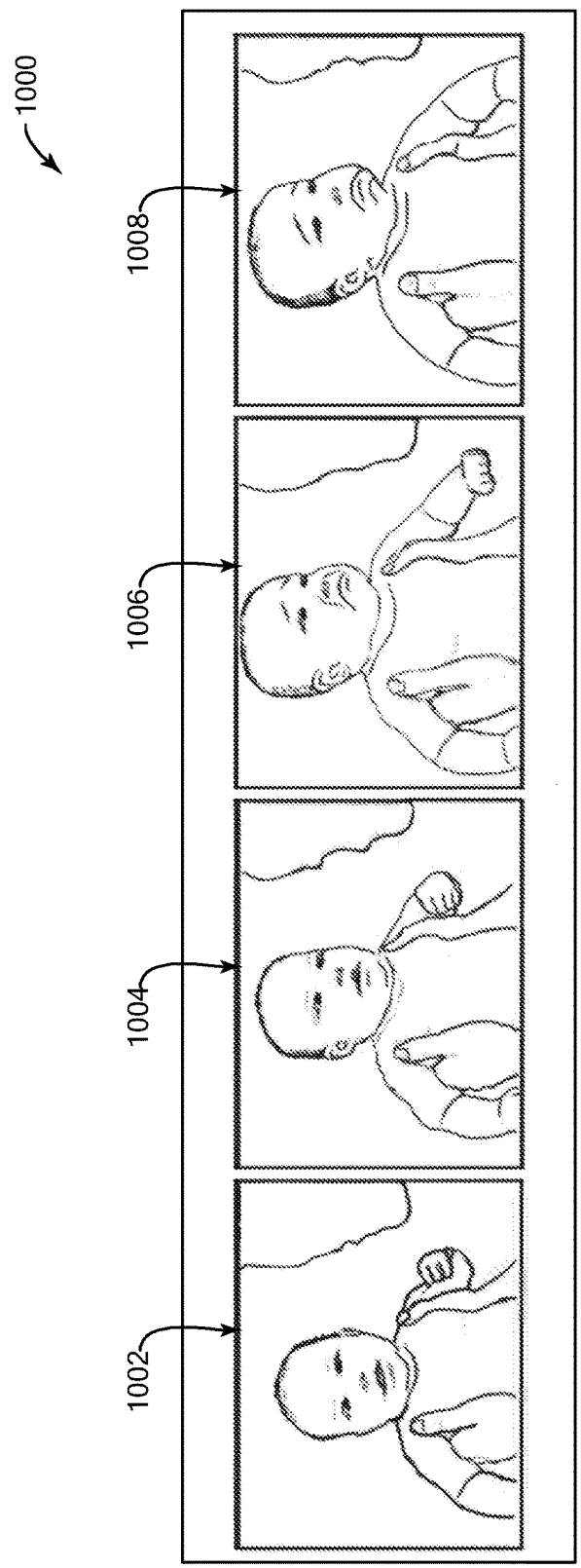

FIGS. 8-10 are diagrammatic illustrations related to examples of displayed visualizations determined from one or more sets of images using one or more features described herein. These figures represent images having pixels, e.g., digital photographs or videos originally captured by one or more cameras. In some implementations, the visualizations shown in FIGS. 8-10 can be displayed in a user interface that in turn can be displayed on a display device, e.g., of a client device 120, 122, 124, and/or 126 of FIG. 1, or a server system 102 in some implementations. In some implementations, visualizations can be created and processed as described herein and displayed in other types of user interfaces, one or more screens of an application program, or other visual output of a display device. In other implementations, visualizations can be created and processed as described herein without being displayed, or can be displayed in other ways.

FIG. 8 shows a representation of an example displayed visualization 800 which can be generated as described herein. Visualization 800 can include multiple images captured by a camera, e.g., still photographs or images in video clips. The images can be selected based on one or more templates. In this example, visualization 800 has been created based on a group template similarly as described herein. For example, according to stored instructions associated with the group template, the system examined the images of a set of images to find images satisfying template criteria. The set of images can be available photographs and videos of the user, e.g., in accessible user albums stored by one or more client devices, in user accounts on servers, and/or on other accessible storage devices. The set of images may also have been processed to remove or discard some images from consideration, e.g., having less desirable visual pixel characteristics as described with respect to FIG. 3.

In the example of FIG. 8, the horizontal row of images 802, 804, 806, and 808 in the visualization 800 represents a series of images displayed in sequence in the visualization. These images were determined to have met the criteria of the group template, e.g., each image depicts multiple faces. In addition, in this example, the group template instructed to place images depicting the most faces at the beginning and end of the visualization. Starting at the image 802 on the left, each image to the right is displayed in sequence, in place of the previous image. Image 802 at the left side of visualization 800 (the beginning) and image 808 at the right side of the visualization (the end) depict the most faces found in the set of images. For example, either image can be placed at beginning and at the end. Alternatively, additional stored criteria of the template (or user/default preferences) can specify the placement. For example, additional criteria can specify that the images having the larger-sized faces are placed at the beginning (or alternatively, end) of the visualization. The images 804 and 806 depicting fewer faces can be placed in the middle of the visualization sequence, e.g., in random order, or with most faces first, etc.

The visualization 800 can be displayed in response to a particular event, e.g., receiving an input command from the user on a user device, receiving or capturing the set of images from which the images 802-808 are obtained, a periodic automatic display of a visualization for the user, a request or message received from a different user over a network, etc. Displaying the visualization can include displaying the images 802-808 in sequence, one after the other, e.g., in a displayed user interface on the user device. The timing of the display of images can be according to a schedule based the template instructions, user preferences, default settings, and/or other conditions and factors, some examples of which are described above. Other implementations can place a video (e.g., a portion or clip of a video) in the place of any of the images 802-808 in visualization 800, e.g., where the video is displayed at the appropriate time in the designated sequence. In other implementations, all or a subset of the group of selected images 802-808 can be displayed simultaneously by a device used by a user, e.g., as shown in FIG. 8.

FIG. 9 shows a representation of another example visualization 900 which can be generated as described herein. Visualization 900 can include multiple images captured by a camera, similarly as visualization 800, e.g., still photographs or video clips. In this example, an emotion template was used to select images from the set of images to include in the visualization 900. The emotion template instructed to select images depicting one or more faces that express emotions that were determined to have emotional strength scores above a specified emotional strength score threshold. Previously, a system processed the set of images to determine the emotional strength scores of the faces depicted in the images of the set, and stored those scores. Those scores can be accessed to determine which images satisfy the emotional score threshold required by the emotion template.

As a result, images 902, 904, 906, and 908 are selected for inclusion in the visualization 900. Other cases may include less or more images, and/or one or more videos, in a visualization similar to visualization 900. For example, images 902 and 908 depict faces showing a happy emotion, as detected by the mouths and other features of the faces. Images 904 and 906 depict faces showing a solemn or sad emotion, as detected by facial features. Other images of the set may have depicted emotions but may not have scored strongly enough to be included in the visualization 900. The images 902-808 can be placed in an order based on template instructions, user preferences, default settings, etc. For example, user preferences may have instructed that for visualizations based on the emotion template, a happy face image should be placed at the beginning and end of the visualization, as shown in the example of visualization 900.

The visualization 900 can be displayed in response to a particular event as described above. Displaying the visualization can include displaying the images 902-908 in sequence. The timing of the display of images can be similar to visualization 800 described above. Other implementations can place a video in the place of any of the images 902-908 in visualization 900. In other implementations, all or a subset of the group of selected images 902-908 can be displayed simultaneously by a device used by a user, e.g., as shown in FIG. 9.

FIG. 10 shows a representation of another example visualization 1000 which can be generated as described herein. Visualization 1000 can include multiple images captured by a camera. This example shows different sample images obtained from a video in the set of images. In this example, an emotion change template was used to select the images from the set of images to include in the visualization 1000. The emotion change template instructed to select images depicting one or more faces that express a change in an emotion over a specified emotional score threshold, e.g., the range of emotions depicted covers at least a threshold range of emotion score. Previously, a system processed the video to determine emotional strength scores of the faces depicted in the images of the set, and stored those scores. For example, particular frames of the video may have been sampled to analyze for detected faces, emotions, etc. Those scores can be accessed to determine which image sequences satisfy the emotional score threshold required by the emotion change template.

As a result, images 1002, 1004, 1006, and 1008 are selected for including in the visualization 1000. In this example, image 1002 depicts a face showing a happier emotion, as detected by the mouths and other features of the depicted face Image 1004 depicts the same face in a more neutral emotion. Images 1006 and 1008 depict the same face having transitioned to a sad emotion, as detected by facial features. The range of emotional strength score covered by the images 1002 to 1008 is above a score range threshold required for the template, so the images 1004 to 1008 are included in the visualization 1000. Other cases may include less or more images. In some implementations or cases, one or more of the images 1002-1008 can be videos (e.g., short video clips) provided in the visualization 1000, or the images 1002-1008 can represent a single video clip (e.g., copied in whole from the original video) starting with image 1002 and ending soon after image 1008.

The visualization 1000 can be displayed in response to a particular event as described above. The timing of the display of images can be similar to visualizations described above, or based on a timing of the video (if any of images 1002-1008 are, or are included in, a video clip). Some implementations can change the timing of an existing video clip to emphasize the depicted emotions, e.g., slow down the portions of a single video clip that show the faces of images 1002-1008, and speed up portions of the video between and/or outside the portions 1002-1008. In other implementations, all or a subset of the group of selected images 1002-1008 can be displayed simultaneously by a device used by a user, e.g., as shown in FIG. 10.

Some implementations can include in a visualization one or more animations that are made from images, e.g., cinemagraphs or animated gif animations formed from multiple images, e.g., of the same scene. Some implementations can create such animations based on images or video frames and can place the animations in a visualization. For example, if several images showing a change in emotion are selected for a visualization, and if these images are suitable to create an animation (e.g., stable background, only a few moving elements, captured within a short time period, etc.), then the animation can be created. For example, a looping animated gif that repeats the same animation sequence can be displayed for a particular time period sufficient to see several loops of animation, before displaying the next image or video clip in the visualization.

Figure 11:
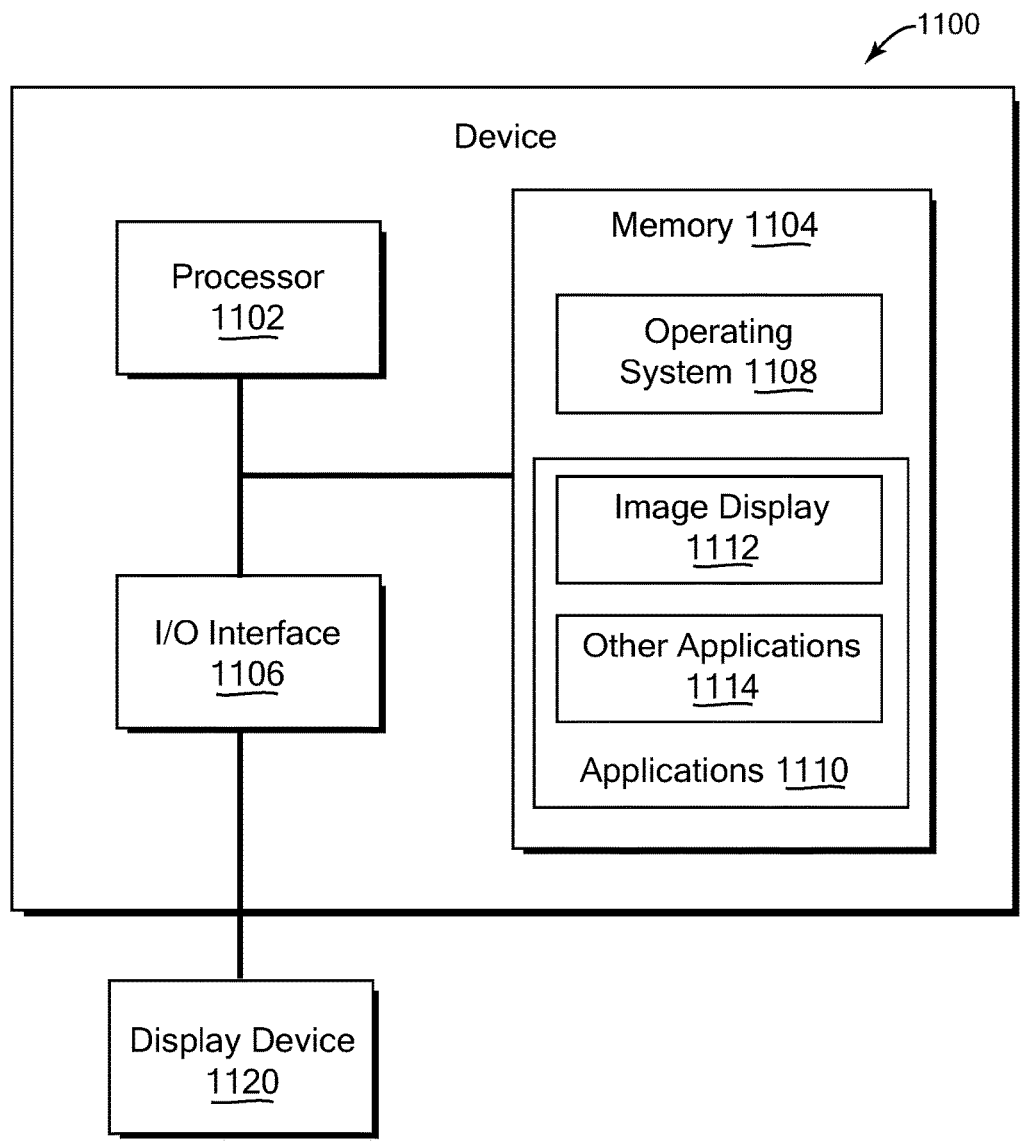
FIG. 11 is a block diagram of an example device which may be used for one or more implementations described herein.

FIG. 11 is a block diagram of an example device 1100 which may be used to implement one or more features described herein. In one example, device 1100 may be used to implement computer device used to implement a server device, e.g., server device 104 of FIG. 1, and perform appropriate method implementations described herein. Device 1100 can be any suitable computer system, server, or other electronic or hardware device. For example, the device 1100 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1100 includes a processor 1102, a memory 1104, and input/output (I/O) interface 1106.

Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108 and one or more applications 1110, e.g., a graphics editing engine, web hosting engine, social networking engine, etc. In some implementations, applications 1110 can include instructions that enable processor 1102 to perform the functions described herein, e.g., some or all of the methods of FIGS. 2-7. For example, applications 1110 can include one or more image display applications 1112, including an image display program to receive user input to select images, templates, and/or criteria and provide output data causing display of images, videos, and visualizations on a display device 1120 of the device 1100. An image display program, for example, can provide a displayed user interface responsive to user input to display selectable options/controls and images based on selected options. Other applications or engines 1114 can also or alternatively be included in applications 1110, e.g., image editing applications, media display applications, communication applications, web hosting engine or application, social networking engine or application, etc. Any of software in memory 1104 can alternatively be stored on any other suitable storage location or computer-readable medium. In addition, memory 1104 (and/or other connected storage device(s)) can store images, videos, templates and template instructions, visualization data, user preferences, system settings, and other instructions and data used in the features described herein. Memory 1104 and any other type of storage (magnetic disk, optical disk, magnetic tape, or other tangible media) can be considered "storage" or "storage devices."

I/O interface 1106 can provide functions to enable interfacing the server device 1100 with other systems and devices. For example, network communication devices, storage devices (e.g., memory and/or database 106), and input/output devices can communicate via interface 1106. In some implementations, the I/O interface can connect to interface devices including input devices (keyboard, pointing device, touchscreen, microphone, camera, scanner, etc.) and/or output devices (display device, speaker devices, printer, motor, etc.). Display device 1120 is one example of an output device that can be used to display content, e.g., one or more images provided in an image display interface or other output application as described herein. Display device 1120 can be connected to device 1100 via local connections (e.g., display bus) and/or via networked connections and can be any suitable display device, some examples of which are described below.

For ease of illustration, FIG. 11 shows one block for each of processor 1102, memory 1104, I/O interface 1106, and software blocks 1108 and 1110. These blocks may represent one or more processors or processing circuitries, operating systems, memories, I/O interfaces, applications, and/or software modules. In other implementations, device 1100 may not have all of the components shown and/or may have other elements including other types of elements instead of, or in addition to, those shown herein. While server system 102 is described as performing operations as described in some implementations herein, any suitable component or combination of components of system 102 or similar system, or any suitable processor or processors associated with such a system, may perform the operations described.

A client device can also implement and/or be used with features described herein, e.g., client devices 120-126 shown in FIG. 1. Example client devices can be computer devices including some similar components as the device 1100, e.g., processor(s) 1102, memory 1104, and I/O interface 1106. An operating system, software and applications suitable for the client device can be provided in memory and used by the processor, e.g., image display software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 1120, for example, can be connected to (or included in) the device 1100 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods of FIGS. 2-7) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems and methods discussed herein may collect or use personal information about users (e.g., user data, information about a user's social network, user's location, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a users geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide a visualization from images, the method comprising:
   obtaining a set of images;
   determining, by a processor, one or more pixel characteristics of the set of images;
   detecting, by the processor, one or more faces depicted in the set of images based on the one or more pixel characteristics of the set of images;
   determining, by the processor, a respective score for each of a plurality of templates stored in a storage device, wherein the respective score is based on one or more of a frequency or strength of one or more pixel characteristics detected in the set of images that match template scoring characteristics of the template associated with the respective score, wherein each template defines a different set of selection characteristics of images as a basis to select an associated plurality of images from the set of images;
   determining a recommended group of templates from the plurality of templates based on the respective scores of the templates;
   causing the recommended group of templates to be displayed on a user device as displayed elements selectable by a user;
   receiving a selection of at least one template of the recommended group of templates based on input received by the user device from the user;
   selecting, by the processor and without user input, a group of images from the set of images, wherein selecting the group of images is based on the at least one selected template by selecting the group of images that match the set of selection characteristics defined by the at least one selected template, wherein the group of images is selected such that at least one different face is depicted in each image of the group of images;
   generating, by the processor and without user input, the visualization including the group of images; and
   providing the visualization to the user device in response to a user request to cause the group of images to be displayed by the user device.

2. The method of claim 1 wherein the visualization is a video, and wherein the group of images is displayed in the video in a particular sequence.

3. The method of claim 2 wherein generating the visualization includes placing, by the processor, images of the group of images that depict a greater number of faces at one or more of a beginning and an end of the particular sequence of the video, and placing, by the processor, images depicting a fewer number of faces between the beginning and the end of the particular sequence.

4. The method of claim 2 wherein images in the group of images in the visualization are designated to be displayed one at a time in the particular sequence, wherein successive images of the group of images are displayed in place of displayed previous images of the group of images, wherein each image is designated in the visualization by the processor to be displayed for an amount of time in the particular sequence based on a number of faces in the image.

5. The method of claim 1 wherein each image in the group of images depicts a respective plurality of faces, and is selected such that no two images in the group of images depict the same plurality of faces.

6. The method of claim 1 further comprising detecting one or more emotions depicted in the set of images, including determining an emotional strength score for at least one face depicted in one or more of the set of images, and
   wherein selecting the group of images includes selecting images that depict faces that portray an emotion having an associated emotional strength score that satisfies a predetermined threshold.

7. The method of claim 1 wherein selecting a group of images includes:
   determining, by the processor, a person who most frequently is depicted in the set of images, and selecting, by the processor, at least one image of the set of images that depicts the person to include in the group of images.

8. The method of claim 1 wherein the set of images are provided as frames in one or more videos, and wherein selecting the group of images includes selecting a group of video clips from the one or more videos, each of the video clips including multiple frames.

9. The method of claim 1 wherein at least one of the plurality of templates is a group template having a determined score based on associated template scoring characteristics that include:
   a number of faces depicted in each image, and
   a number of images of the set of images that depict multiple faces,
   wherein determining the recommended group of templates includes determining that the at least one group template is included in the recommended group of templates based on the score of the at least one group template being over a threshold.

10. The method of claim 9 wherein the at least one selected template is the group template and the group template defines a set of selection characteristics that specify that selected images include multiple faces, and wherein selecting the group of images includes selecting images that depict multiple faces.

11. The method of claim 9 wherein determining a respective score for each of the plurality of templates includes determining the score of the group template based on increasing a contribution by each image in the set of images to the score of the group template in correspondence with a number of faces depicted in the image.

12. The method of claim 9 wherein determining a respective score for each of the plurality of templates includes determining the score of the group template based on a number of images in the set of images that depict multiple faces and depict at least one face that is different than respective faces depicted in one or more other images of the set of images.

13. The method of claim 1 wherein the at least one selected template includes multiple selected templates, and wherein selecting the group of images includes selecting one or more particular images in the set of images based on each set of selection characteristics defined by the multiple selected templates.

14. The method of claim 1 wherein each of the plurality of templates includes associated placement instructions that indicate locations in a display sequence of the visualization to place images of the associated plurality of images.

15. The method of claim 14 wherein the at least one selected template includes multiple selected templates, wherein the multiple selected templates are assigned respective placement priorities, wherein the placement priorities indicate a priority order to apply the associated placement instructions of the multiple selected templates to generate the visualization.

* * * * *